(12) United States Patent
Song et al.

(10) Patent No.: US 11,586,905 B2
(45) Date of Patent: Feb. 21, 2023

(54) SYSTEMS AND METHODS FOR CUSTOMIZING KERNEL MACHINES WITH DEEP NEURAL NETWORKS

(71) Applicant: Arizona Board of Regents, Scottsdale, AZ (US)

(72) Inventors: Huan Song, Tempe, AZ (US); Jayaraman Thiagarajan, Dublin, CA (US); Andreas Spanias, Tempe, AZ (US)

(73) Assignees: ARIZONA BOARD OF REGENTS ON BEHALF OF ARIZONA STATE UNIVERSITY, Scottsdale, AZ (US); LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 1175 days.

(21) Appl. No.: 16/152,841

(22) Filed: Oct. 5, 2018

(65) Prior Publication Data
US 2019/0108444 A1    Apr. 11, 2019

Related U.S. Application Data

(60) Provisional application No. 62/571,145, filed on Oct. 11, 2017.

(51) Int. Cl.
*G06N 3/08* (2006.01)
*G06F 17/16* (2006.01)

(52) U.S. Cl.
CPC .............. *G06N 3/08* (2013.01); *G06F 17/16* (2013.01)

(58) Field of Classification Search
None
See application file for complete search history.

(56) References Cited

U.S. PATENT DOCUMENTS 9,461,676 B2    10/2016    Santucci et al.
9,507,011 B2    11/2016    Zhang et al.
(Continued)

FOREIGN PATENT DOCUMENTS

CN    107316066         * 7/2017    .............. G06K 9/62
CN    201710437809 A    * 12/2017    .............. G06N 3/08
(Continued)

OTHER PUBLICATIONS

Dropout: A Simple Way to Prevent Neural Networks from Overtting, Srivastava et al., Journal of Machine Learning Research 15 (2014) 1929-1958.*

(Continued)

*Primary Examiner* — David J Stoltenberg
(74) *Attorney, Agent, or Firm* — Bryan Cave Leighton Paisner LLP

(57) ABSTRACT

A method including receiving an input data set. The input data set can include one of a feature domain set or a kernel matrix. The method also can include constructing dense embeddings using: (i) Nyström approximations on the input data set when the input data set comprises the kernel matrix, and (ii) clustered Nyström approximations on the input data set when the input data set comprises the feature domain set. The method additionally can include performing representation learning on each of the dense embeddings using a multi-layer fully-connected network for each of the dense embeddings to generate latent representations corresponding to each of the dense embeddings. The method further can include applying a fusion layer to the latent representations corresponding to the dense embeddings to generate a combined representation. The method additionally can include performing classification on the combined representation. Other embodiments of related systems and methods are also disclosed.

20 Claims, 12 Drawing Sheets

(56) References Cited

U.S. PATENT DOCUMENTS

| | | | |
|---|---|---|---|
| 9,710,916 | B2 | 7/2017 | Thiagarajan et al. |
| 9,779,497 | B2 | 10/2017 | Thiagarajan et al. |
| 9,875,428 | B2 | 1/2018 | Ramamurthy et al. |
| 2011/0304745 | A1* | 12/2011 | Wang ............... G06T 15/50 348/229.1 |
| 2016/0217368 | A1* | 7/2016 | Ioffe ............... G06K 9/6298 |
| 2017/0124483 | A1* | 5/2017 | Huang ............. G06N 20/10 |
| 2017/0270664 | A1* | 9/2017 | Hoogi ............. A61B 6/5217 |
| 2018/0101768 | A1* | 4/2018 | Laine .............. G06N 3/0454 |
| 2018/0137393 | A1* | 5/2018 | Nguyen .......... G06K 9/6268 |
| 2018/0144465 | A1* | 5/2018 | Hsieh ............... G06N 3/08 |
| 2018/0197046 | A1 | 7/2018 | Braun et al. |
| 2018/0352414 | A1 | 12/2018 | Zhang et al. |
| 2019/0073580 | A1* | 3/2019 | Dzhulgakov ..... G06N 3/084 |

FOREIGN PATENT DOCUMENTS

| | | |
|---|---|---|
| WO | 2014144306 A1 | 9/2014 |
| WO | 2014152919 A1 | 9/2014 |
| WO | 2014152929 A1 | 9/2014 |

OTHER PUBLICATIONS

Clustered Nyström Method for Large Scale Manifold Learning and Dimension Reduction, Zhang et al., IEEE Transactions on Neural Networks, vol. 21, No. 10, Oct. 2010.*

A Deep Learning Approach to Multiple Kernel Fusion, Song et al., arXiv:1612.09007v1 [stat.ML] Dec. 28, 2016.*

Abu-El-Haija, S. et al., "YouTube-8M: A Large-Scale Video Classification Benchmark", Computer Vision and Pattern Recognition, Sep. 2016, 10 pages.

Andreeva, A. et al., "SCOP2 prototype: a new approach to protein structure mining", Nucleic Acids Research, Jan. 2014 (available online Nov. 2013), vol. 42, No. D1, pp. D310-D314 <DOI:10.1093/nar/gkt1242>.

Bucak, S. et al., "Multiple Kernel Learning for Visual Object Recognition: A Review", IEEE Transactions on Pattern Analysis and Machine Intelligence, Jul. 2014 (date of publication Nov. 2013), vol. 36, No. 7, pp. 1354-1369 <DOI:10.1109/TPAMI.2013.212>.

Cawley, G. et al., "On Over-filling in Model Selection and Subsequent Selection Bias in Performance Evaluation", Journal of Machine Learning Research, Jul. 2010, vol. 11, pp. 2079-2107.

Chapelle, O. et al., "Semi-Supervised Classification by Low Density Separation", 10th International Workshop on Artificial Intelligence and Statistics (Barbados, Jan. 6-8, 2005), 2005, pp. 57-64.

Cho, Y. et al., "Kernel Methods for Deep Learning", Proceedings of the 23rd Annual Conference on Neural Information Processing Systems (Vancouver, Canada, Dec. 7-10, 2009), 2009, pp. 342-350.

Chollet, F., "Keras Database", retrieved Aug. 2, 2019 from archive.org, as it appeared on May 22, 2015], retrieved from the internet <URL:https://web.archive.org/web/20150522055317/https://github.com/fchollet/keras>.

Cortes, C. et al., "Learning non-linear combinations of kernels", 23rd Annual Conference on Neural Information Processing Systems (Vancouver, Canada, Dec. 7-10, 2009), 2009, pp. 396-404.

Cortes, C. et al., "Multi-class classification with maximum margin multiple kernel", Proceedings of the 30th International Conference on Machine Learning (Atlanta, GA, Jun. 16-21, 2013), 2013, vol. 28, pp. 46-54.

Deng, J. et al., "ImageNet: A large-scale hierarchical image database", IEEE Conference on Computer Vision and Pattern Recognition (Miami, FL, Jun. 20-25, 2009), 2009 (date added to IEEE Xplore Aug. 2009), pp. 248-255 <DOI:10.1109/CVPR.2009.5206848>.

Dhillon, I. et al., "Kernel k-means: spectral clustering and normalized cuts", Proceedings of the 10th International Conference on Knowledge Discovery and Data Mining (Seattle, WA, Aug. 22-25, 2004), 2004, pp. 551-556 <DOI:10.1145/1014052.1014118>.

Ding, C. et al., "Multi-class protein fold recognition using support vector machines and neural networks", Bioinformatics, Apr. 2001, vol. 17, No. 4, pp. 349-358 <DOI:10.1093/bioinformatics/17.4.349>.

Drineas, P. et al., "On the Nystrom Method for Approximating a Gram Matrix for Improved Kernel-Based Learning", Journal of Machine Learning Research, Dec. 2005, vol. 6, pp. 2153-2175.

Frank, J. et al., "Activity and gait recognition with time-delay embeddings", Proceedings of the 24th AAAI Conference an Artificial Intelligence (Atlanta, GA, Jul. 11-15, 2010), 2010, pp. 1581-1586.

Gehler, P. et al., "On feature combination for multiclass object classification", IEEE 12th International Conference on Computer Vision (Kyoto, Japan, Sep. 29-Oct. 2, 2009), 2009 (date added to IEEE Xplore Jul. 2010), pp. 221-228 <DOI:10.1109/ICCV.2009.5459169>.

Gönen, M. et al., "Localized multiple kernel learning", Proceedings of the 25th International Conference on Machine Learning (Helsinki, Finland, Jul. 5-9, 2008), 2008, pp. 352-359 <DOI:10.1145/1390156.1390201>.

Gönen, M. et al., "Multiple Kernel Learning Algorithms", The Journal of Machine Learning Research, Jul. 2011, vol. 12, pp. 2211-2268.

Harandi, M. et al., "Expanding the Family of Grassmannian Kernels: An Embedding Perspective", European Conference on Computer Vision (Zurich, Switzerland, Sep. 6-12, 2014), 2014, pp. 408-423.

He, K. et al., "Deep Residual Learning for Image Recognition", IEEE Conference on Computer Vision and Pattern Recognition (Las Vegas, NV, Jun. 27-30, 2016), 2016 (date added to IEEE Xplore Dec. 2016), pp. 770-778 <DOI:10.1109/CVPR.2016.90>.

Huang, P-S. et al., "Kernel methods match Deep Neural Networks on TIMIT", IEEE International Conference on Acoustics, Speech and Signal Processing (Florence, Italy, May 4-9, 2014), 2014 (date added to IEEE Xplore Jul. 2014), pp. 205-209 <DOI:10.1109/ICASSP.2014.6853587>.

Ioffe, S. et al., "Batch normalization: accelerating deep network training by reducing internal covariate shift", ICML 15 Proceedings of the 32nd International Conference on International Conference on Machine Learning (Lille, France, Jul. 6-11, 2015), 2015, vol. 37, pp. 448-456.

Jain, A. et al., "SPF-GMKL: generalized multiple kernel learning with a million kernels", Proceedings of the 18th International Conference on Knowledge Discovery and Data Mining (Beijing, China, Aug. 12-16, 2012), 2012, pp. 750-758 <DOI:10.1145/2339530.2339648>.

Jhuo, I-H. et al., "Boosted Multiple Kernel Learning for Scene Category Recognition", 20th International Conference an Pattern Recognition (Istanbul, Turkey, Aug. 23-26, 2010), 2010 (date added to IEEE Xplore Oct. 2010), pp. 3504-3507 <DOI:10.1109/ICPR.2010.855>.

Kannao, R. et al., "TV Commercial Detection Using Success Based Locally Weighted Kernel Combination", 22nd International Conference on MultiMedia Modeling (Miami, FL, Jan. 4-6, 2016), 2016, pp. 793-805 <DOI:10.1007/978-3-319-27671-7_66>.

Krizhevsky, A. et al., "ImageNet classification with deep convolutional neural networks", Advances in Neural Information Processing Systems, 2012, 9 pages.

Kumar, S. et al., "Ensemble Nystrom Method", 23rd Annual Conference on Neural Information Processing Systems (Vancouver, Canada, Dec. 7-10, 2009), 2009, pp. 1060-1068.

Kumar, S. et al., "Sampling Methods for the Nystrom Method", Journal of Machine Learning Research, Apr. 2012, vol. 13, pp. 981-1006.

Kwapisz, J. et al., "Activity recognition using cell phone accelerometers", ACM SIGKDD Explorations Newsletter, Dec. 2010, vol. 12, No. 2, pp. 74-82 <DOI:10.1145/1964897.1964918>.

Le, Q. et al., "Fastfood—Computing Hilbert Space Expansions in loglinear time", Proceedings of the 30th International Conference on Machine Learning (Atlanta, GA, Jun. 16-21, 2013), 2013, vol. 28, pp. 244-252.

Levy, O. et al., "Neural Word Embedding as Implicit Matrix Factorization", Proceedings of the 27th International Conference on

(56) References Cited

OTHER PUBLICATIONS

Neural Information Processing Systems (Montreal, Canada, Dec. 8-13, 2014), 2014, pp. 2177-2185.

Li, J. et al., "Nonlinear Combination of Multiple Kernels for Support Vector Machines", 20th International Conference on Pattern Recognition (Istanbul, Turkey, Aug. 23-26, 2010), 2010 (date added to IEEE Xplore Oct. 2010), pp. 2889-2892 <DOI:10.1109/ICPR.2010.708>.

Li, M. et al., "Large-Scale Nystrom Kernel Matrix Approximation Using Randomized SVD", IEEE Transactions on Neural Networks and Learning Systems, Jan. 2015 (date of publication Oct. 2014), vol. 26, No. 1, pp. 152-164 <DOI:10.1109/TNNLS.2014.2359798>.

Liu, F. et al., "Multiple Kernel Learning in the Primal for Multimodal Alzheimer's Disease Classification", IEEE Journal of Biomedical and Health Informatics, May 2014 (date of publication Oct. 2013), vol. 18, No. 3, pp. 984-990 <DOI:10.1109/JBHI.2013.2285378>.

Lodhi, H. et al., "Text Classification using String Kernels", Journal of Machine Learning Research, Feb. 2002, vol. 2, pp. 419-444.

Mairal, J. et al., "Convolutional Kernel Networks", Proceedings of the 27th International Conference on Neural Information Processing Systems (Montreal, Canada, Dec. 8-13, 2014), 2014, pp. 2627-2635.

Mairal, J., "End-to-End Kernel Learning with Supervised Convolutional Kernel Networks", 30th Conference on Neural Information Processing Systems (Barcelona, Spain, Dec. 5-10, 2016), 2016, pp. 1399-1407.

Moeller, J. et al., "A Unified View of Localized Kernel Learning", Proceedings of the 2016 SIAM International Conference on Data Mining (Miami, FL, May 5-7, 2016), 2016, pp. 252-260 <DOI:10.1137/1.9781611974348.29>.

Nair, V. et al., "Rectified Linear Units Improve Restricted Boltzmann Machines", ICML '10 Proceedings of the 27th International Conference on Machine Learning (Haifa, Israel, Jun. 21-24, 2010), 2010, pp. 807-814.

Natarajan, P. et al., "Multimodal feature fusion for robust event detection in web videos", IEEE Conference on Computer Vision and Pattern Recognition (Providence, RI, Jun. 16-21, 2012), 2012 (date added to IEEE Xplore Jul. 2012), pp. 1298-1305 <DOI:10.1109/CVPR.2012.6247814>.

Ong, C. et al., "An Automated Combination of Kernels for Predicting Protein Subcellular Localization", 8th International Workshop on Algorithms in Bioinformatics (Karlsruhe, Germany, Sep. 15-19, 2008), 2008, pp. 186-197 <DOI:10.1007/978-3-540-87361-7_16>.

Orabona, F. et al., "Multi Kernel Learning with Online-Batch Optimization", Journal of Machine Learning Research, Feb. 2012, vol. 13, pp. 227-253.

Orabona, F. et al., "Ultra-fast optimization algorithm for sparse multi kernel learning", Proceedings of the 28th International Conference on Machine Learning (Bellevue, WA, Jun. 28-Jul. 2, 2011), 2011, pp. 249-256.

Qi, X. et al., "Pairwise Rotation Invariant Co-Occurrence Local Binary Pattern", IEEE Transactions on Pattern Analysis and Machine Intelligence, Nov. 2014 (date of publication Apr. 2014), vol. 36, No. 11, pp. 2199-2213 <DOI:10.1109/TPAMI.2014.2316826>.

Rahimi, A. et al., "Random features for large-scale kernel machines", Proceedings of the 20th International Conference on Neural Information Processing Systems (Vancouver, Canada, Dec. 3-6, 2007), 2007, pp. 1177-1184.

Rakotomamonjy, A. et al., "SimpleMKL", Journal of Machine Learning Research, Nov. 2008, vol. 9, pp. 2491-2521.

Song, H. et al., "A deep learning approach to multiple kernel fusion", IEEE International Conference on Acoustics, Speech and Signal Processing (New Orleans, LA, Mar. 5-9, 2017), 2017 (date added to IEEE Xplore Jun. 2017), pp. 2292-2296 <DOI:10.1109/ICASSP.2017.7952565>.

Song, H. et al., "Auto-context modeling using multiple Kernel learning", IEEE International Conference on Image Processing (Phoenix, AZ, Sep. 25-28, 2016), 2016 (date added to IEEE Xplore Aug. 2016), pp. 1868-1872 <DOI:10.1109/ICIP.2016.7532682>.

Song, H. et al., "Consensus inference on mobile phone sensors for activity recognition", IEEE International Conference on Acoustics, Speech and Signal Processing (Shanghai, China, Mar. 20-25, 2016), 2016 (date added to IEEE Xplore May 2016), pp. 2294-2298 <DOI:10.1109/ICASSP.2016.7472086>.

Song, H. et al., "Optimizing Kernel Machines Using Deep Learning", IEEE Transactions on Neural Networks and Learning Systems, Nov. 2018 (date of publication Mar. 2018), vol. 29, No. 11, pp. 5528-5540 <DOI:10.1109/TNNLS.2018.2804895>.

Srivastava, N. et al., "Dropout: A Simple Way to Prevent Neural Networks from Overfitting", Journal of Machine Learning Research, Jun. 2014, vol. 15, No. 1, pp. 1929-1958.

Takeda, H. et al., "Kernel Regression for Image Processing and Reconstruction", IEEE Transactions on Image Processing, Feb. 2007 (available online Jan. 2007), vol. 16, No. 2, pp. 349-366 <DOI:10.1109/TIP.2006.888330>.

Thiagarajan, J. et al., "Image Understanding Using Sparse Representations", Synthesis Lectures on Image, Video and Multimedia Processing, 2014, vol. 7, No. 1, pp. 1-118.

Thiagarajan, J. et al., "Multiple kernel interpolation for inverting non-linear dimensionality reduction and dimension estimation", IEEE International Conference on Acoustics, Speech and Signal Processing (Florence, Italy, May 4-9, 2014), 2014, pp. 6751-6755 <DOI:10.1109/ICASSP.2014.6854907>.

Thiagarajan, J. et al., "Multiple Kernel Sparse Representations for Supervised and Unsupervised Learning", IEEE Transactions on Image Processing, Jul. 2014 (date of publication May 2014), vol. 23, No. 7, pp. 2905-2915 <DOI:10.1109/TIP.2014.2322938>.

Van Der Maaten, L. et al., "Visualizing Data using t-SNE", Journal of Machine Learning Research, Nov. 2008, vol. 9, pp. 2579-2605.

Venkataraman, V. et al., "Shape Distributions of Nonlinear Dynamical Systems for Video-Based Inference", IEEE Transactions on Pattern Analysis and Machine Intelligence, Dec. 2016 (date of publication Feb. 2016), vol. 38, No. 12, pp. 2531-2543 <DOI:10.1109/TPAMI.2016.2533388>.

Vishwanathan, S. et al., "Graph Kernels", Journal of Machine Learning Research, Apr. 2010, vol. 11, pp. 1201-1242.

Vishwanathan, S. et al., "Multiple Kernel Learning and the SMO Algorithm", 24th Annual Conference on Neural Information Processing Systems (Vancouver, Canada, Dec. 6-9, 2010), 2010, pp. 2361-3269.

Von Luxburg, U., "A tutorial on spectral clustering", Statistics and Computing, Dec. 2007 (available online Aug. 2007), vol. 17, No. 4, pp. 395-416 <DOI:10.1007/s11222-007-9033-z>.

Wiering, M. et al., "Multi-Layer Support Vector Machines", Regularization, Optimization, Kernels, and Support Vector Machines, Oct. 2014, Ch. 1, pp. 3-21.

Wilson, A. et al., "Deep Kernel Learning", Proceedings of the 19th International Conference on Artificial Intelligence and Statistics (Cadiz, Spain, May 9-11, 2016), 2016, vol. 51, pp. 370-378.

Yan, S. et al., "Graph Embedding and Extensions: A General Framework for Dimensionality Reduction", IEEE Transactions on Pattern Analysis and Machine Intelligence, Jan. 2007 (date of publication Nov. 2006), vol. 29, No. 1, pp. 40-51 <DOI:10.1109/TPAMI.2007.250598>.

Zhang, J. et al., "Local Features and Kernels for Classification of Texture and Object Categories: A Comprehensive Study", International Journal of Computer Vision, Jun. 2007 (available online Sep. 2006), vol. 73, No. 2, pp. 213-238 <DOI:10.1007/s11263-006-9794-4>.

Zhang, K. et al., "Clustered Nystrom Method for Large Scale Manifold Learning and Dimension Reduction", IEEE Transactions on Neural Networks, Oct. 2010 (date of publication Aug. 2010), vol. 21, No. 10, pp. 1576-1587 <DOI:10.1109/TNN.2010.2064786>.

Zhang, M. et al., "USC-HAD: a daily activity dataset for ubiquitous activity recognition using wearable sensors", Proceedings of the ACM Conference on Ubiquitous Computing (Pittsburgh, Pennsylvania, Sep. 5-8, 2012), 2012, pp. 1036-1043 <DOI:10.1145/2370216.2370438>.

Zhang, S. et al., "Max Consensus in Sensor Networks: Non-Linear Bounded Transmission and Additive Noise", IEEE Sensors Journal, Dec. 2016 (date of publication Sep. 2016), vol. 16, No. 24, pp. 9089-9098 <DOI:10.1109/JSEN.2016.2612642>.

(56) References Cited

OTHER PUBLICATIONS

Zhuang, J. et al., "Two-Layer Multiple Kernel Learning", Proceedings of the 14th International Conference on Artificial Intelligence and Statistics (Fort Lauderdale, FL, Apr. 11-13, 2011), 2011, vol. 15, pp. 909-917.

Zien, A. et al., "Multiclass multiple kernel learning", Proceedings of the 24th International Conference on Machine Learning (Corvalis, Oregon, Jun. 20-24, 2007), 2007, pp. 1191-1198 <DOI:10.1145/1273496.1273646>.

\* cited by examiner

Cytosolic and Nuclear Sequences

MVTPALQMKKPKQFCRRMGQKKQRPARAGQPHS...

MPARGGSARPGRGSLKPVSVTLLPDTEQPPFLGRA...

MFLEVADLKDGLWVWKVVFLQVCIEASGWGAEV...

421

Mitochondrion Sequences

MLRATLARLEMAPKVTHIQEKLLINGKFVPAVSGK...

MLRAALSTARRGPRLSRLLSAAATSAVPAPNQQPE...

MYRRLGEVLLLSRAGPAALGSAAADSAALLGWAR...

422

Secretory Pathway Sequences

MVEMLPTAILLVLAVSVVAKDNATCDGPCGLRFRQNPQG...

MQLLRCFSIFSVIASVLAQELTTICEQIPSPTLESTPYSLST...

MIQGLESIMNQGTKRILLAATLAATPWQVYGSIEQPSLLP...

SYSTEMS AND METHODS FOR CUSTOMIZING KERNEL MACHINES WITH DEEP NEURAL NETWORKS

CROSS-REFERENCE TO RELATED APPLICATIONS

This application claims the benefit of U.S. Provisional Application No. 62/571,145, filed Oct. 11, 2017. U.S. Provisional Application No. 62/571,145 is incorporated herein by reference in its entirety.

STATEMENT REGARDING FEDERALLY SPONSORED RESEARCH OR DEVELOPMENT

This invention was made with government support under 1540040 awarded by the National Science Foundation. The government has certain rights in the invention.

The United States Government has rights in this invention pursuant to Contract No. DE-AC52-07NA27344 between the United States Department of Energy and Lawrence Livermore National Security, LLC for the operation of Lawrence Livermore National Laboratory.

TECHNICAL FIELD

This disclosure relates generally to customizing kernel machines with deep neural networks.

BACKGROUND

Deep Neural Networks (DNNs) have been used in a wide variety of computer vision tasks. Modern deep architectures can be coupled with large datasets, customization strategies, and utilization of graphics processing units (GPUs) to obtain highly effective predictive models. By using a composition of multiple non-linear transformations, along with novel loss functions, DNNs can approximate a large class of functions for prediction tasks.

BRIEF DESCRIPTION OF THE DRAWINGS

To facilitate further description of the embodiments, the following drawings are provided in which:

FIG. 4(b) illustrates sequences belonging to three different classes in the non-plant dataset for protein subcellular localization;

Figure 1:
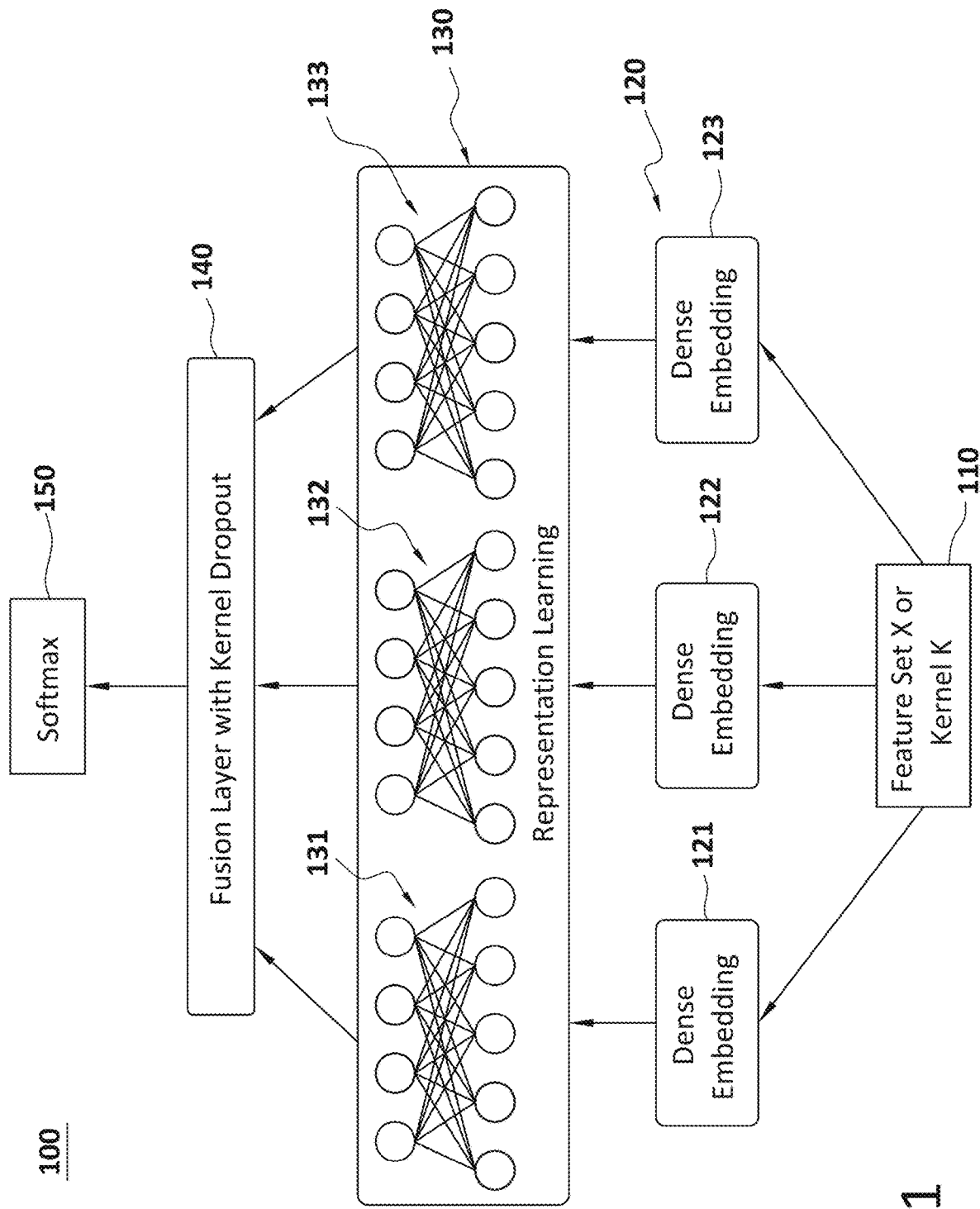
FIG. 1 illustrates a flow diagram of an exemplary method 100 of implementing a Deep Kernel Machine Optimization (DMKO) algorithm for customizing (e.g., optimizing) kernel machines using deep neural networks, according to an embodiment.

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled.

Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION OF EXAMPLES OF EMBODIMENTS

Various embodiments can include a system including one or more processors and one or more non-transitory computer-readable media storing computing instructions configured to run on the one more processors and perform certain acts. The acts can include receiving an input data set. The input data set can include one of a feature domain set or a kernel matrix. The acts also can include constructing dense embeddings using: (i) Nyström approximations on the input data set when the input data set comprises the kernel matrix, and (ii) clustered Nyström approximations on the input data set when the input data set comprises the feature domain set. The acts additionally can include performing representation learning on each of the dense embeddings using a multi-layer fully-connected network for each of the dense embeddings to generate latent representations corresponding to each of the dense embeddings. The acts further can include applying a fusion layer to the latent representations corresponding to the dense embeddings to generate a combined representation. The acts additionally can include performing classification on the combined representation.

A number of embodiments can include a method being implemented via execution of computing instructions configured to run at one or more processors and stored at one or more non-transitory computer-readable media. The method can include receiving an input data set. The input data set can include one of a feature domain set or a kernel matrix. The method also can include constructing dense embeddings using: (i) Nyström approximations on the input data set when the input data set comprises the kernel matrix, and (ii) clustered Nyström approximations on the input data set when the input data set comprises the feature domain set. The method additionally can include performing representation learning on each of the dense embeddings using a multi-layer fully-connected network for each of the dense embeddings to generate latent representations corresponding to each of the dense embeddings. The method further can include applying a fusion layer to the latent representations corresponding to the dense embeddings to generate a combined representation. The method additionally can include performing classification on the combined representation.

The recent surge in representation learning for complex, high-dimensional data has revolutionized machine learning and data analysis. The success of DNNs in a wide variety of computer vision tasks has demonstrated the usefulness of highly non-linear and nonparametric models. In particular, by coupling modern deep architectures with large datasets, efficient customization (e.g., optimization) strategies and GPU utilization, highly effective predictive models can be obtained. By using a composition of multiple non-linear transformations, along with novel loss functions, DNNs can approximate a large class of functions for prediction tasks. However, the increasing complexity of the networks often involves exhaustive tuning of several hyper-parameters in the discrete space of network architectures, which often results in sub-optimal solutions or model overfitting. This is particularly more common in applications characterized by limited dataset sizes and complex dependencies in the input space. Despite the advances in regularization techniques and data augmentation strategies, in many scenarios, it is challenging to obtain deep architectures that provide significant performance improvements over conventional machine learning solutions. In such cases, a popular alternative solution to building effective, non-linear predictive models is to employ kernel machines.

Kernel Methods in Machine Learning

Kernel methods have a long-standing success in machine learning, primarily due to their well-developed theory, convex formulations, and their flexibility in incorporating prior knowledge of the dependencies in the input space. In general, kernel methods can induce an implicit mapping into a reproducing kernel Hilbert space (RKHS), through the construction of a positive definite similarity matrix between samples in the input space, and enable model inference in that space. An appealing feature of this approach is that even simple linear models inferred in the RKHS are highly effective compared to their linear counterparts learned directly in the input space. Denoting the input domain as $X \subset \mathbb{R}^d$, the kernel function k: $X \times X' \to \mathbb{R}$ induces a RKHS $\mathcal{H}_k$ with the corresponding inner product $<.,.>_{\mathcal{H}_k}$ and the norm $\|.\|_{\mathcal{H}_k}$. For a set of data-label pairs $\{x_i, y_i\}_{j=1}^n$, where $y_i$ corresponds to the label of the sample $x_i \in \mathbb{R}^d$, the problem of inferring a predictive model can be posed as the following empirical risk minimization task:

$$f_{opt} = \underset{f \in \mathcal{H}_k}{\mathrm{argmin}} \frac{1}{n} \sum_i \mathcal{L}(y_i, f(x_i)) + \lambda \|f\| \mathcal{H}_k, \quad (1)$$

where $\mathcal{L}$ denotes a chosen loss function and $\lambda$ is the regularization parameter. For example, in kernel ridge regression $\mathcal{L}$ can be chosen to be the $l_2$ (least squares error function) loss while kernel Support Vector Machine (SVM) can use the hinge loss. A variety of general purpose kernels are used in practice, such as the polynomial and radial basis function (RBF) kernels.

Kernel methods can be versatile, in that specifying a positive-definite kernel can enable the use of this generic customization (e.g., optimization) framework for any data representation, such as vectors, matrices, sequences or graphs. Consequently, a broad range of kernel construction strategies have been used, e.g. $X^2$ kernel, string, and graph kernels. Furthermore, the classical Representer Theorem allows the representation of any optimal function in $\mathcal{H}_k$ as $$f_{opt}(x) = \sum_i \alpha_i k(x, x_i), \quad (2)$$

thereby enabling construction of a dual optimization problem for Equation (1) based solely on the kernel matrix and not the samples explicitly. This approach is commonly referred as the "kernel trick." Finally, kernel methods can be augmented with a variety of strategies for controlling the learning capacity and hence reduce model overfitting.

Despite these advantages, kernel methods can have some limitations when applied in practice. The first limitation is their computational complexity, which grows quadratically with the sample size due to the computation of the kernel (Gram) matrix. A possible solution to address this challenge is to approximate the kernel matrix using the Nyström method or the random Fourier features based methods for shift-invariant kernels. While the Nyström method obtains a low-rank approximation of the kernel matrix, the latter explicitly maps the data into a Euclidean inner product space using randomized feature maps. Another limitation of kernel methods is that, unlike the state-of-the-art deep learning systems, the data representation and model learning stages are decoupled and hence cannot admit end-to-end learning. Consequently, in recent years, there have been efforts to combine principles from both kernel methods and deep learning for improved learning. Broadly speaking, conventional approaches either utilize kernel compositions to emulate neural network layer stacking or facilitate the customization (e.g., optimization) of deep architectures with data-specific kernels. Combining the advantages of these two paradigms of predictive learning can potentially lead to new architectures and inference strategies. For example, kernel learning can be utilized to define a new type of convolutional networks, which has been demonstrated to improve performance in inverse imaging problems.

In many embodiments, the problem of customizing (e.g., optimizing) kernel machines using deep neural networks is addressed. In a number of embodiments, an embedding layer is created for the kernel matrices, and fully connected deep networks are employed with novel regularization strategies for predictive model inference.

Multiple Kernel Learning

Similar to many other learning paradigms, it can be challenging to choose suitable parameters for a specific application, such as determining which kernel to use. In practice, suitable parameters can be chosen using a grid-search on each of the parameters, coupled with cross-validation. However, this exhaustive search can become quickly intractable, when additional parameters such as the classifier hyperparameter and feature design customization (e.g., optimization) come into play. Multiple Kernel Learning (MKL) algorithms aim at automatically selecting and combining multiple base kernels to achieve superior performance when compared to the individual kernels. Different strategies can be used for combining the kernel matrices, such that the resulting matrix is also positive definite, that is, a valid kernel. Common examples include non-negative sum or hadamard product of the matrices.

Although this approach provides additional parameters to obtain a customized (e.g., optimal) RKHS for effective inference, the customization (e.g., optimization) (dual) is computationally more challenging, particularly with the increase in the number of kernels. More importantly, in practice, this customization (e.g., optimization) does not produce consistent performance improvements over a simple baseline kernel constructed as the unweighted average of the base kernels. Furthermore, extending MKL techniques, designed primarily for binary classification, to multi-class classification problems is not straightforward. In contrast to the conventional one-vs-rest approach, which decomposes the problem into multiple binary classification problems, in MKL it is beneficial to obtain the weighting of base kernels with respect to all classes.

In several embodiments, in the end-to-end kernel machine training described herein, extension to the case of multiple kernels is straightforward and, with appropriate regularization, the multiple kernel learning customization (e.g., optimization) can be highly efficient, in terms of convergence characteristics.

In many embodiments, a deep learning-based solution to kernel machine customization (e.g., optimization) is developed, for single- and/or multiple-kernel cases. Although existing kernel approximation techniques make kernel learning efficient, utilizing deep networks enables end-to-end inference with a task-specific objective. In contrast to conventional approaches, which replace the conventional neural network operations (e.g. convolutions) using equivalent computations in the RKHS, several embodiments use the similarity kernel to construct dense embeddings for data and employ fully connected neural networks to infer the predictive model.

In a number of embodiments, the systems and methods described herein can provide a generic approach that is not restricted to applications that can use convolutional neural networks. Similar to conventional kernel methods, the systems and methods described herein can exploit the native space of the chosen kernel during inference, which can advantageously control the capacity of learned models, and beneficially lead to improved generalization. In some embodiments, in scenarios where multiple kernels are available during training, either corresponding to multiple feature sources or from different kernel parameterizations, a multiple kernel variant using a global fusion layer to combine the representations from different kernels can be used. Preliminary results on kernel fusion using deep networks, as described below in greater detail, demonstrate the utility of these approaches.

In several embodiments, the systems and methods provide an end-to-end Deep Kernel Machine Optimization (DKMO) approach, which builds dense embeddings for data using the similarity kernel, learns concise representations, and infers the predictive model for a given kernel. In many embodiments, to improve the quality of the learned models, an ensemble of dense embeddings can be generated using Nyström approximation methods, and latent feature fusion can be performed, coupled with a kernel dropout regularization. In addition to improved convergence, the dropout described can lead to more accurate models. In a number of embodiments, a multiple kernel variant of the DKMO (M-DKMO) can be used, which advantageously can effectively perform multiple kernel learning with different feature sources or kernel parameterizations. In some embodiments, the systems and methods described herein can provide superior results in comparison to the baseline kernel SVMs and the state-of-the-art MKL algorithms in a variety of classification applications. For example, empirical studies with a variety of datasets from cell biology, image classification, and activity recognition demonstrate the benefits over conventional approaches, as described below.

Kernel Machine Customization (Optimization)

The power of kernel methods is commonly adopted in the formulation of Support Vector Machines (SVM). The success of kernel SVMs motivated the kernelization of a broad range of linear machine learning formulations in the Euclidean space. Common examples are regression, clustering, unsupervised and supervised dimension reduction algorithms, dictionary learning for sparse representations, and many others. Following the advent of more advanced data representations in machine learning algorithms, such as graphs and points on embedded manifolds, kernel methods provided a flexible framework to perform statistical learning with such data. Examples include the large class of graph kernels and Grassmannian kernels for Riemannian manifolds of linear subspaces.

Broadly speaking, kernel methods circumvent the challenge of constructing explicit maps to the RKHS by solving the dual formulation of risk minimization problems. Despite the flexibility of this approach, dealing with kernel matrices makes the customization (e.g., optimization) infeasible in large scale data. There are two class of approaches commonly used by researchers to alleviate this challenge.

First, kernel approximation strategies can be used to reduce both computational and memory complexity of kernel methods, e.g. the Nyström method. A component in the Nyström method is to select a subset of the kernel matrix for approximation. Straightforward uniform sampling has been demonstrated to provide reasonable performance in many cases. An improved variant of Nyström approximation employs k-means clustering to obtain landmark points in order to construct a subspace in the RKHS. The approximation error is bounded by the quantization error of coding each sample using its closest landmark. An ensemble of approximations has been generated by repeating Nyström random sampling multiple times for improving the quality of the approximation.

Second, in the case of shift-invariant kernels, random Fourier features can be used to design scalable kernel machines. Instead of using the implicit feature mapping in the kernel trick, another approach uses a random feature method for approximating kernel evaluation. The idea is to explicitly map the data to a Euclidean inner product space using randomized feature maps, such that kernels can be approximated using Euclidean inner products. Using random Fourier features, shallow kernel machines can match the performance of deep networks in speech recognition, while being computationally efficient.

Combining Multiple Kernels

An extension to a single kernel machine is to use multiple kernels. In this approach, the objective is to learn a combination of base kernels $k_1, \ldots, k_M$ and perform empirical risk minimization simultaneously. Conical and convex combinations are commonly considered, and efficient optimizers, such as Sequential Minimal Optimization (SMO) and Spectral Projected Gradient (SPG) techniques, can be used. MKL algorithms can be applied to a wide-range of machine learning problems. With base kernels constructed from distinct features, MKL can be utilized as a feature fusion mechanism. When base kernels originate from different kernel functions or parameterizations, MKL can automate the kernel selection and parameter tuning process. The multiple kernel learning problem can be solved directly using its primal formulation, with random Fourier features.

These fusion schemes can be generalized further to create localized multiple kernel learning (LMKL) and non-linear MKL algorithms. A unified view of LMKL algorithms can be formulated as:

$$k_\beta(x_i, x_j) = \sum_m \beta_m(x_i, x_j) k_m(x_i, x_j) \qquad (3)$$

where $\beta_m$ is the gating function for kernel function $k_m$. In contrast to "global" MKL formulations where the weight $\beta_m$ is constant across data, the gating function in Equation (3) takes the data sample as an independent variable and is able to characterize the underlying local structure in data. Several LMKL algorithms differ in how $\beta_m$ is constructed and how the customization (e.g., optimization) is carried out. For example, $\beta_m$ can be chosen to be separable into softmax functions. On the other hand, non-linear MKL algorithms can be based on the idea that non-linear combination of base kernels could provide richer and more expressive representations compared to linear mixing. For example, polynomial combination of base kernels can be considered and a two-layer neural network can be utilized to construct a RBF kernel composition on top of the linear combination.

Bridging Deep Learning and Kernel Methods

One conventional approach at improving the representation power of kernel machines by incorporating principles from the state-of-the-art representation learning paradigms involves defining an arc-cosine kernel. Based on the observation that arc-cosine kernels possess characteristics similar to an infinite single-layer threshold network, the behavior of DNN can be emulated by composition of arc-cosine kernels. The kernel composition idea using neural networks can be extended to MKL. The connection between kernel learning and deep learning can also be drawn through Gaussian process, such as by deriving deep kernels through the Gaussian process marginal likelihood. Another class of approaches directly incorporates kernel machines into Deep Neural Network (DNN) architectures. For example, a multi-layer SVM can be constructed by replacing neurons in multi-layer perceptrons (MLP) with SVM units. Kernel approximation can be carried out using supervised subspace learning in the RKHS, and backpropagation based training similar to convolutional neural network (CNN) is adopted to customize (e.g., optimize) the parameters. Experimental results on image classification and super-resolution show that the new type of network can achieve competitive performance as compared to CNN.

In many embodiments, the systems and methods described herein can provide an alternative viewpoint to kernel machine customization (e.g., optimization) by considering the kernel approximation as an embedding of the data and employ deep neural networks, coupled with a kernel dropout strategy, to infer effective representations from an ensemble of subspace projections in the RKHS. An advantageous feature of this approach is that extension to the multiple kernel case is straightforward.

Formulation of Kernel Methods

Given the feature domain $X \subset \mathbb{R}^d$, the matrix of n samples can be defined as $X=[x_1^T, \ldots, x_n^T]$. A function k: $X \times X \rightarrow \mathbb{R}$ defines a valid kernel if it gives rise to a positive definite kernel matrix K satisfying Mercer's condition. In this case, k also defines an implicit mapping $\varphi$ to the RKHS $\mathcal{H}_k$ and an inner product $\langle \ldots \rangle$ in $\mathcal{H}_k$, such that $k(x_i, x_j) = \langle \varphi(x_i), \varphi(x_j) \rangle_{\mathcal{H}_k}$.

When data from two classes are not linearly separable, it is often beneficial to transform them through the nonlinear mapping $\varphi$ to a higher-dimensional space $\mathcal{H}_k$, such that a non-linear decision boundary can be effectively learned using linear classifiers. For example, the RBF kernel can map data into an infinite dimensional RKHS and can admit a large class of decision functions, referred as the "native space." An advantage of kernel methods is that they do not require an explicit definition of the mapping $\varphi$ and utilize the dual formulation of customization (e.g., optimization) problem defined solely based on the kernel matrix K. For example, the kernel SVM formulation can be expressed as:

$$\max_\alpha \sum_i \alpha_i - \frac{1}{2} \sum_i \sum_j \alpha_i \alpha_j y_i y_j k(x_i, x_j) \quad (4)$$

$$\text{such that } 0 \leq \alpha_i \leq C, \forall i; \sum_i \alpha_i y_i = 0.$$

where $\alpha_i$ are the Lagrangian multipliers, C is the misclassification trade-off parameter and the kernel k is pre-defined by the user.

Choosing a suitable kernel for an application can be a challenge, so it is common to consider multiple kernels based on different kernel similarity constructions or feature sources for the data. In such scenarios, combining the kernels in a customized (e.g., optimized) form can beneficially perform improved inference. Referred to as Multiple Kernel Learning, this process supports a wide variety of strategies for combining, with the most common choice being the convex combination:

$$k(x_i, x_j) = \sum_m \beta_m k_m(x_i, x_j) \quad (5)$$

with $\Sigma \beta_m = 1$ and $\beta \geq 0$. In MKL, the kernel weights can be customized (e.g., optimized) while reducing the empirical risk. The dual formulation for multiple kernel learning can hence be obtained as:

$$\min_\beta \max_\alpha \sum_i \alpha_i - \frac{1}{2} \sum_i \sum_j \alpha_i \alpha_j y_i y_j \sum_m \beta_m k_m(x_i, x_j) \quad (6)$$

$$\text{such that } \sum_i \alpha_i y_i = 0; 0 \leq \alpha_i \leq C, \forall i; \sum_m \beta_m = 1, \beta \geq 0$$

In its naive form, the dual customization (e.g., optimization) problem in kernel methods is computationally expensive and has memory usage that is quadratic in the number of samples n. Consequently, different approaches to speed up kernel methods exist and the Nyström approximation is a useful strategy.

Approximation using the Nyström Method

Consider the kernel Gram matrix $K \in \mathbb{R}^{n \times n}$, where $K_{i,j} = k(x_i, x_j)$. Operating with kernel matrices can make kernel methods highly ineffective in large-scale problems. Consequently, significantly reducing the computational and memory complexity for scaling kernel methods can be beneficial. In kernel approximation, the objective is to find an approximate kernel map $L \in \mathbb{R}^{n \times r}$, such that $K \approx LL^T$ where $r \ll n$. Truncated Singular Value Decomposition (SVD) factorizes K to $U_K \wedge_K U_K^T$, where $\wedge_K = \text{diag}(\sigma_1, \ldots, \sigma_n)$ contains the eigenvalues in non-increasing order and $U_K$ contains the corresponding eigenvectors. Subsequently, a rank-r approximation $\tilde{K}_r$ is constructed using the top eigenvectors, that is, $\tilde{K}_r = \Sigma_{i=1}^r \sigma_i^{-1} U_K^{(i)} U_K^{(i)T}$. This procedure provides the optimal rank-r approximation in terms of the Frobenius norm, however this incurs $O(n^3)$ time complexity making it infeasible in practice. While several kernel approximation methods exist, Nyström methods outperform other existing greedy and random sampling approaches.

In the Nyström method, a subset of s columns can be selected from K to approximate the eigen-system of the kernel matrix. Denote $W \in \mathbb{R}^{s \times s}$ as the intersection of the selected columns and corresponding rows on K and $E \in \mathbb{R}^{n \times s}$ containing the selected columns. The rank-r approximation $\tilde{K}_r$ of K is computed as:

$$\tilde{K}_r = E \tilde{W}_r E^T \quad (7)$$

where $r \leq s$ and $\tilde{W}_r$ is the optimal rank-r approximation of W obtained using truncated SVD. As can be observed, the time complexity of the approximation reduces to $O(s^3)$, which corresponds to performing SVD on W. This can be further reduced by randomized SVD algorithm. The approximate mapping function L can then be obtained by:

$$L = E(U_{\tilde{W}_r} \wedge_{\tilde{W}_r}^{-1/2}) \quad (8)$$

where $U_{\tilde{W}_r}$ and $\wedge_{\tilde{W}_r}$ are top r eigenvalues and eigenvectors of W. As discussed above, different techniques can be used to effectively sample from kernel matrices.

Deep Kernel Machine Optimization-Single Kernel Case

Turning now to the drawings, FIG. 1 illustrates a flow diagram of an exemplary method 100 of implementing a Deep Kernel Machine Optimization (DMKO) algorithm for customizing (e.g., optimizing) kernel machines using deep neural networks, according to an embodiment. In several embodiments, the power of deep architectures can be utilized in end-to-end learning and feature fusion to facilitate kernel methods. The overall framework is illustrated in FIG. 1 as a DMKO. For a given kernel, multiple dense embeddings can be generated using kernel approximation techniques, and then fused in a fully connected deep neural network. The architecture can utilize fully connected networks with kernel dropout regularization during the fusion stage. The DKMO can handle scenarios when both the feature sources and the kernel matrix are available during training or when the kernel similarities alone can be accessed.

Referring to FIG. 1, viewed from bottom to top, multiple dense embeddings, such as dense embeddings 121, 122, 123, can first be extracted in a dense embeddings layer 120 from an input 110, which can be a precomputed kernel matrix K, or optionally the feature domain x, if accessible during training. On top of each dense embedding (e.g., 121-123), a fully connected neural network (e.g., 131, 132, 133) can be built for a representation learning 130. For example, fully connected neural network 131 can be built for dense embedding 121, fully connected neural network 132 can be built for dense embedding 122, and/or fully connected neural network 133 can be built for dense embedding 123. Given the inferred latent spaces from representation learning, a fusion layer 140 can be used, which can be responsible for fusing them and obtaining a concise representation for inference tasks. Finally, a softmax layer 150 can be used at the top to perform classification. In many embodiments, softmax layer 150 can implement the softmax function, as is conventionally used in the final layer of a neural network-based classifier. Note that, similar to random Fourier feature based techniques in kernel methods, a mapping can be learned to the Euclidean space, based on the kernel similarity matrix. However, in contrast, the representation learning phase, in many embodiments, is not decoupled from the actual task, and hence can lead to high-fidelity predictive models.

Dense Embedding Layer

FIG. 1 shows that the components of representation learning 130 and fusion of hidden features using fusion layer 140 are generic, that is, they are separate from the input data or kernel. Consequently, dense embedding layer 120 can be the component that bridges kernel representations with the DNN training, thereby enabling an end-to-end training. Consider the j-th column $k_j$ of a kernel matrix K. It can encode the relevance between sample $x_j$ to all other samples $x_i$ in the training set, and hence this can be viewed as an embedding for $x_j$. As a result, these naive (e.g., sparse) embeddings can potentially be used in the input layer of the network. In some cases, $k_j$ has large values at location corresponding to training samples belonging to the same class as $x_j$ and zeros at others. Unfortunately, the sparsity and high dimensionality of these embeddings can make them unsuitable for inference tasks.

In many embodiments, an approach to alleviate this challenge is to adopt kernel matrix factorization strategies, which transform the original embedding into a more tractable, low-dimensional representation. In contrast to the original embedding, which is high-dimensional and contains mostly zero values (i.e., at least 50% zero values, but often the percentage is much higher than 50%), these "dense" embeddings (e.g., 121-123) are lower-dimensional (i.e., lower dimensional than the original embedding), and contain non-zero values in every dimension. As described above, this procedure can be viewed as kernel approximation with truncated SVD or Nyström methods. Furthermore, this is conceptually similar to the process of obtaining dense word embeddings in natural language processing. For example, the popular skip-gram with negative sampling (SGNS) model in language modeling is implicitly factorizing the Pointwise Mutual Information matrix, whose entries measure the association between pairs of words. Alternate word embeddings obtained using the truncated SVD method are more effective than SGNS on some word modeling tasks.

In conventional deep kernel learning approaches, such as the convolutional kernel networks, multiple reproducing kernel Hilbert spaces can be constructed at different layers of the network, with a sequence of pooling operations between the layers to facilitate kernel design for different sub-region sizes. However, this approach cannot generalize to scenarios where the kernels are not constructed from images, for example, in the case of biological sequences. In several embodiments, multiple approximate mappings can be obtained from the feature set or the kernel matrix using Nyström methods, and the DNN can be utilized as both representation learning and feature fusion mechanisms to obtain an explicit representation for data in the Euclidean space.

In a number of embodiments, in order to be flexible with different application-specific constraints, two different pipelines can be used for constructing the dense embeddings based on Nyström approximation. First, when the input data is constructed from pre-defined feature sources, clustered Nyström method can be employed, which identifies a subspace in the RKHS using clustering algorithm, and explicitly projects the feature mappings in RKHS onto the subspace. In this case, the dense embeddings (e.g., 121-123) can be obtained without constructing the complete kernel matrix for the dataset. Second, in many applications, such as those involving DNA sequences and graphs, obtaining the kernel matrices is often easier than extracting effective features for inference tasks. For many existing datasets, pair-wise distance matrices are already formed and can be easily converted into kernel matrices. In such scenarios, the conventional Nyström method can be utilized, as described above, to calculate the dense embeddings (e.g., 121-123). Various embodiments of implementation details are discussed below.

Clustered Nyström Approximations on Feature Set

In many embodiments, k-means cluster centroids can be utilized as the set of the "landmark points" from X. Denoting the matrix of landmark points b $Z=[z_1, \ldots, z_r]$ and the subspace they span by $\mathcal{F}=\text{span}(\varphi(z_1), \ldots, \varphi(z_r))$, the projection of the sample $\varphi(x_1), \ldots, \varphi(x_n)$ in $\mathcal{H}_k$ onto its subspace $\mathcal{F}$ is equivalent to the following Nyström approximation:

$$L_z = E_z W_z^{-1/2}, \quad (9)$$

where $(E_z)_{i,j}=k(x_i, z_j)$ and $(W_z)_{i,j}=k(z_i, z_j)$. As it can be observed in the above expression, kernel matrices $W_z \in \mathbb{R}^{r \times r}$ and $E_z \in \mathbb{R}^{n \times r}$ can be constructed, which are computationally efficient since r «n. Comparing Equations (9) and (8) shows that $L_z$ is directly related to L by a linear transformation when r=s, since:

$$W_z^{-1/2} = U_Z \Lambda U_z^{-1/2} U_Z^T, \quad (10)$$

where $U_Z$ and $A_Z$ are eigenvectors and the associated eigenvalues of $W_Z$ respectively.

In some embodiments, with different sets of clustering centroids spanning distinct subspaces $\{\mathcal{F}_i\}$, the projections can result in completely different representations. Because the performance of the end-to-end learning approach described herein is heavily influenced by the construction of subspaces in the RKHS, in several embodiments, an ensemble of multiple subspace approximations can be inferred for a given kernel. The differences in the representations of the projected features can be exploited in the deep learning fusion architecture to model the characteristics in different regions of the input space. To this end, the selection process can be repeated with different clusterings techniques, such as the k-means, k-medians, k-medoids, agglomerative clustering, and/or spectral clustering based on k nearest neighbors. Additional clustering algorithms or a single clustering algorithm with different parameterizations can be utilized as well. For algorithms which perform partitioning alone and do not provide cluster centroids (e.g. spectral clustering), the centroid of a cluster can be calculated as the means of the features in that cluster. In summary, based on P different landmark matrices $Z_1, \ldots, Z_p$, P different embeddings $L_1, \ldots, L_p$ can be obtained for the feature set using Equation (9).

Conventional Nyström Approximations on Kernel

In a number of embodiments, in applications in which the feature sources are not directly accessible, the dense embeddings (e.g., 121-123) can be constructed from the kernel matrix. An ensemble of kernel approximate mappings can be abstracted through different random sampling sets of the kernel matrix. From K, s×P columns can be randomly selected without replacement, and it can be divided into P sets containing s columns each. The resulting matrices $W_1, \ldots, W_p$, along with the matrices $E_1, \ldots, E_p$ defined above provide the dense embeddings $L_1, \ldots, L_p$ following Equation (8). This approach is conceptually similar to inferring an ensemble of multiple Nyström approximations to construct an approximation of the kernel. However, in many embodiments, this approach can work directly with the approximate mappings instead of kernels, and the mappings can be further coupled with the task-specific customization (e.g., optimization) enabled by the deep architecture.

Representation Learning

In many embodiments, after obtaining the kernel-specific dense embeddings (e.g., dense embeddings 121-123) representation learning 130 can be performed, for each embedding, using a multi-layer fully connected network (e.g., fully connected neural networks 131-133) to obtain a more concise representation for subsequent fusion and prediction stages. Although strategies for sharing weights across the different dense embeddings can be employed, in many embodiments, the networks can be made independent. In certain embodiments, at each hidden layer, dropout regularization can be used to prevent overfitting and batch normalization can be adopted to accelerate training.

Fusion Layer with Kernel Dropout

In several embodiments, fusion layer 140 can receive the latent representations for each of kernel approximate mappings from fully connected neural networks 131-133 and can admit a variety of fusion strategies to obtain the final representation for prediction tasks. Possible merging strategies include concatenation, summation, averaging, multiplication, etc. The backpropagation algorithm can then be used to customize (e.g., optimize) both the parameters of the representation learning 130 and those of fusion layer 140 jointly to improve the classification accuracy. Given the large number of parameters and the richness of different kernel representations, the training process can lead to overfitting. In order to alleviate this issue, "kernel dropout" regularization can be imposed in addition to the activation dropout that is used in the phase representation learning 130.

In conventional dropout regularization for training large neural networks, neurons are randomly chosen to be removed from the network along with their incoming and outgoing connections. The process can be viewed as sampling from a large set of possible network architectures with shared weights.

In several embodiments, given the ensemble of dense embeddings $L_1, \ldots, L_p$, an effective regularization mechanism can be used to prevent the network training from overfitting to certain subspaces in the RKHS. More specifically, fusion layer 140 can be regularized by dropping the entire representations learned from some randomly chosen dense embeddings. Denoting the hidden layer representations before the fusion as $\mathcal{H} = \{h_p\}_{p=1}^P$ and a vector t associated with P independent Bernoulli trials, the representation $h_p$ can be dropped from fusion layer 140 if $t_p$ is 0. The feed-forward operation can be expressed as:

$$\widetilde{\mathcal{H}} = \begin{array}{l} t_p \sim \text{Bernoulli}(P) \\ \{h \mid h \in \mathcal{H} \text{ and } t_p > 0\} \\ \tilde{h} = (h_i), h_i \in \widetilde{\mathcal{H}} \\ \tilde{y}_l = f(w_i \tilde{h} + b_i), \end{array}$$

where $w_i$ are the weights for hidden unit i, (·) denotes vector concatenation and $f$ is the softmax activation function.

Figure 2:
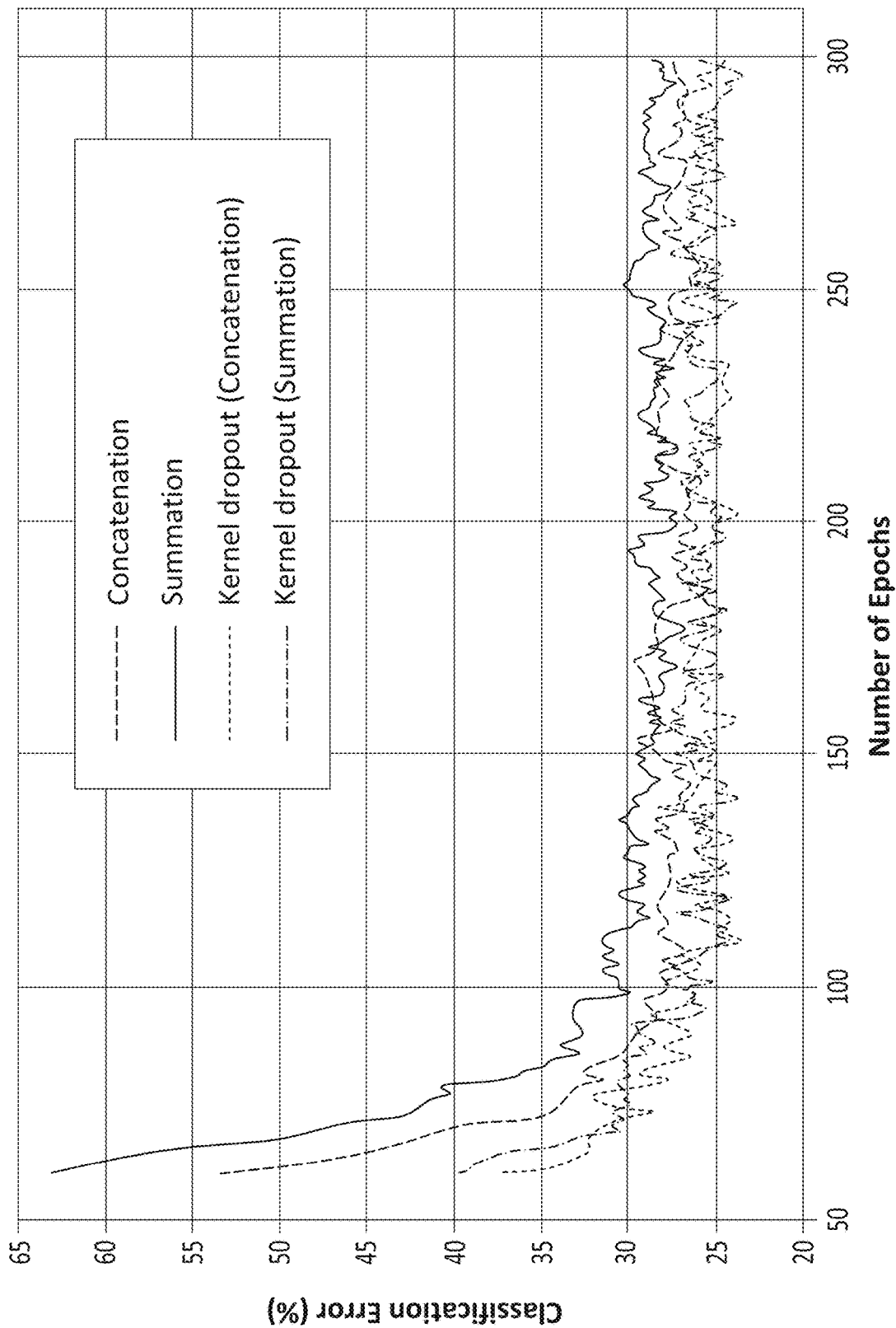
FIG. 2 illustrates a graphical plot that shows the effects of kernel dropout on convergence speed and classification performance of the network in the DKMO training process.

Turning ahead in the drawings, FIG. 2 illustrates a graphical plot that shows the effects of kernel dropout on convergence speed and classification performance of the network in the DKMO training process. The convergence characteristics obtained with the inclusion of the kernel dropout regularization in the fusion layer are compared in FIG. 2 to the non-regularized version. The results shown in FIG. 2 are obtained using one of the kernels used in protein subcellular localization, as described below in further detail. FIG. 2 shows the results obtained with two different merging strategies, specifically, concatenation and summation. FIG. 2 demonstrates that the kernel dropout regularization leads to improved convergence and lower classification error for both the merging styles. Specifically, for both the merging strategies (concatenation and summation), using the regularization described herein can lead to improved convergence and produces lower classification error, thereby evidencing improved generalization of kernel machines.

M-DKMO—Extension to Multiple Kernel Learning

As described above, extending kernel learning techniques to the case of multiple kernels can beneficially enable automated kernel selection and fusion of multiple feature sources. Fusion of multiple sources is particularly common in complex recognition tasks where the different feature sources characterize distinct aspects of data and contain complementary information. Unlike the traditional kernel construction procedures, the problem of multiple kernel learning can be customized (e.g., optimized) with a task-specific objective, e.g., hinge loss in classification.

In many embodiments, in order to customized (e.g., optimize) kernel machines with multiple kernels $\{K\}_{m=1}^M$ (optionally feature sets $\{X\}_{m=1}^M$), the DKMO approach can be employed for each of the kernels independently. As demonstrated by the experimental results described below, the representations for the individual kernels obtained using the described approach can produce superior class separation compared to conventional kernel machine customization (e.g., optimization) (e.g. Kernel SVM). Consequently, the hidden representations from the learned networks can be used to subsequently obtain more effective features by exploiting the correlations across multiple kernels.

Figure 3:
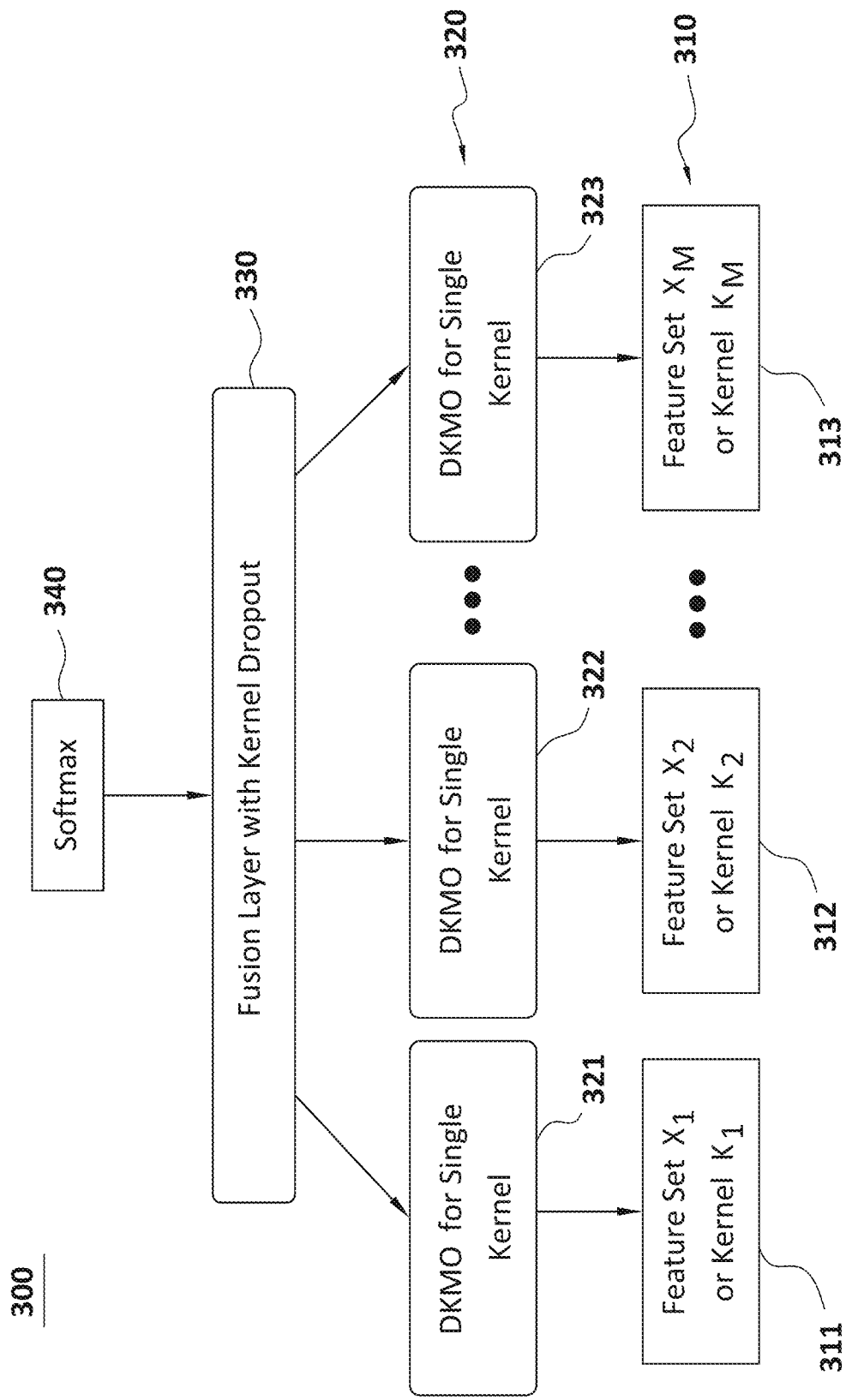
FIG. 3 illustrates a flow diagram of an exemplary method 300 of implementing a Multiple-DKMO (M-DKMO) algorithm for multiple kernel learning, according to another embodiments.

Turning ahead in the drawings, FIG. 3 illustrates a flow diagram of an exemplary method 300 of implementing a M-DKMO algorithm for multiple kernel learning, according to another embodiments. The M-DKMO algorithm can be used to extend the deep kernel customization (e.g., optimization) approach described above to the case of multiple kernels. As shown FIG. 3, an end-to-end learning network can be constructed based on a set 320 of pre-trained DKMO models, such as DKMO models 321, 322, and 323, using multiple inputs 310, such as inputs 311, 312, and 313, corresponding to the different kernels, and a global fusion layer 330 that combines the hidden features from those networks within DKMO models 321-323. Each of the kernels are first independently trained with the DKMO algorithm described above in model 100 (FIG. 1) and then combined using global fusion layer 330. The parameters of global fusion layer 330 and the individual networks in the DKMO models (e.g., 321-323) can be fine-tuned in an end-to-end learning fashion. Similar to the DKMO architecture in FIG. 1, global fusion layer 330 can admit any merging strategy, and can optionally include additional fully connected layers, before applying a softmax layer 340.

In some embodiments, after pre-training the DKMO network for each of the kernels with a softmax layer (e.g., 150 (FIG. 1)), the softmax layer (e.g., 150 (FIG. 1)) can be ignored when combined, and the customized (e.g., optimized) network parameters can be used to initialize the M-DKMO network in FIG. 3. Furthermore, the kernel dropout strategy described above can be adopted in the global fusion layer before applying the merge strategy. This regularization process can beneficially guard against overfitting of the predictive model to any specific kernel and can provide improved generalization. From empirical results, both initialization and regularization strategies enable consistently fast convergence.

Experimental Results

Figure 4A:
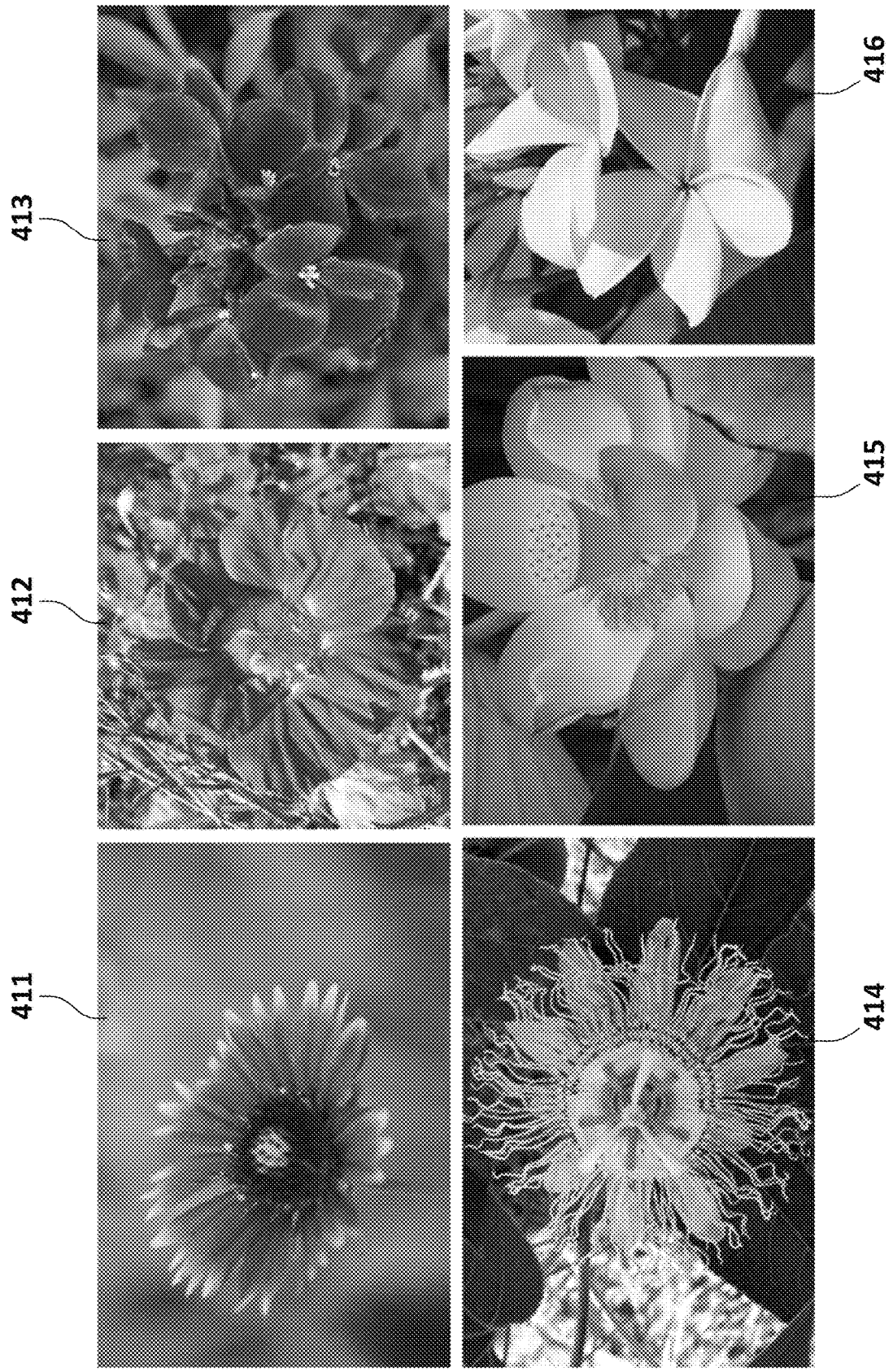
FIG. 4(a) illustrates images from different classes in the flowers 102 dataset.

The performance of the described systems and methods on several real-world datasets covering a wide range of applications including cell biology, image classification and sensor-based activity recognition is described below. FIG. 4 shows examples samples from the datasets used in these experiments. Specifically, FIG. 4(a) illustrates images 411-

Figure 4C:
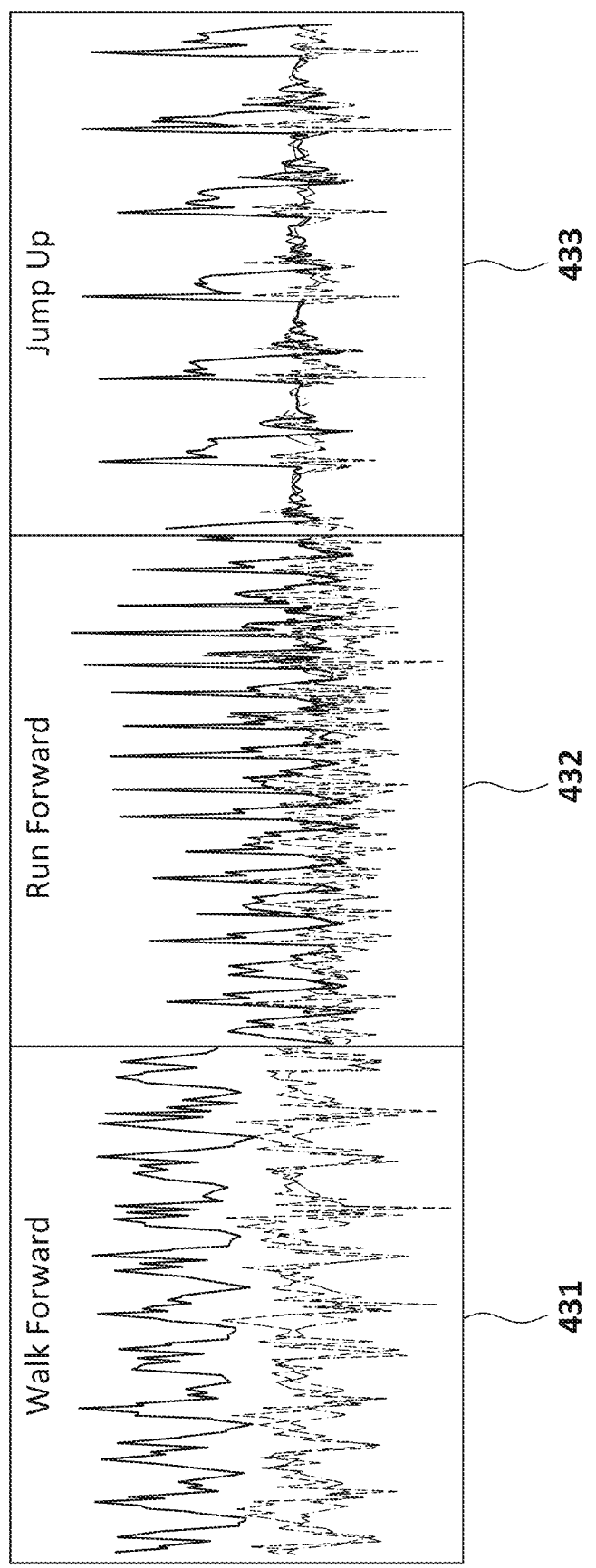
FIG. 4(c) illustrates accelerometer measurements characterizing different activities from the USC-HAD dataset.

416 from different classes in the flowers 102 dataset. FIG. 4(b) illustrates sequences 421-423 belonging to three different classes in the non-plant dataset for protein subcellular localization. FIG. 4(c) illustrates accelerometer measurements 431-433 characterizing different activities from the USC-HAD dataset. The feature sources and kernels can be designed based on state-of-the-art practices. The varied nature of the data representations can be readily handled by the described approach, and kernel machines can be trained for single and multiple kernel cases.

The underlying data representations considered in these experiments are vastly different, i.e., biological sequences, images, and time-series respectively. The flexibility of the described approach enables its use in all these cases without additional pre-processing or architecture fine-tuning. Depending on the application, different feature sources can be accessed, or solely the kernel similarities can be accessed. As described above, the DKMO algorithm can handle both these scenarios by constructing the dense embeddings suitably.

In each application, the described framework is compared with the following baselines: (a) single kernel SVM for each of the kernels, (b) multiple kernel fusion based on simple averaging (Uniform), (c) the state-of-the-art multiple kernel learning algorithm UFO-MKL (Ultra-Fast Optimization Machine Kernel Learning). Following, the optimal C parameters for kernel SVM were obtained based on a grid search on $[10^{-1}, 10^0, 10^1, 10^2] \times C^*$ through cross-validation on the training set, where the default value $C^*$ was $$C^* = 1 \bigg/ \left( \frac{1}{n} \sum_i K_{i,i} - \frac{1}{n^2} \sum_{ij} K_{i,j} \right),$$

which is the inverse of the empirical variance of data in the input space. For UFO-MKL, the optimal C parameters were cross-validated on the grid of $[10^1, 10^0, 10^1, 10^2, 10^3]$.

For all the datasets in the experiments, the DKMO approach is first applied to each of the kernels (as in FIG. 1) with the following parameters: each network consists of 4 hidden layers with sizes 256-512-256-128 respectively. For datasets that allow access to explicit feature sources, 5 dense embeddings were extracted corresponding to the 5 landmark point sets obtained using different clustering algorithms. Alternatively, for datasets with solely kernel similarity matrices between the samples, 6 different dense embeddings were constructed with varying subset sizes and approximation ranks. Kernel dropout regularization was performed with summation merging for the fusion layer in the DKMO architecture. Both regular dropout and kernel dropout rates were fixed at 0.5 and the customization (e.g., optimization) was carried out using the Adam optimizer, with the learning rate set at 0.001. For multiple kernel learning using the M-DKMO approach, each kernel was normalized as $\overline{K}_{i,j} = K_{i,j}/\sqrt{K_{i,i}K_{j,j}}$, so that $\overline{K}_{i,i}=1$. Similar to the DKMO case, the kernel dropout rate was set at 0.5, and summation based merging was used at the global fusion layer in M-DKMO. All network architectures in these experiments were implemented using the Keras library with the TensorFlow backend and trained on a single GTX 1070 GPU.

Protein Subcellular Localization

Kernel methods have been successfully applied to many problems in bioinformatics, including predicting the protein subcellular localization from protein sequences. This experimentation used 4 datasets from C. S. Ong and A. Zien, "An automated combination of kernels for predicting protein subcellular localization," in *International Workshop on Algorithms in Bioinformatics*, Springer, 2008, pp. 186-197: plant, non-plant, psort+ and psort- belonging to 3-5 classes, samples of which are shown in sequences 421-423 in FIG. 4(b). Among the 69 sequence motif kernels, 6 were subselected, which encompass all 5 patterns for each substring format (except for psort-, where one invalid kernel is removed). A 50-50 random split is performed to obtain the train and test sets. Since explicit feature sources are not available, the dense embeddings are obtained using the conventional Nyström sampling method.

TABLE 1

Classification Performance on Protein Subcellular Datasets with Single Kernel Learning
Single Kernel Learning

| Method | Kernel 1 | Kernel 2 | Kernel 3 | Kernel 4 | Kernel 5 | Kernel 6 |
|---|---|---|---|---|---|---|
| PLANT, n = 940 | | | | | | |
| Kernel SVM | 70.1 | 57.8 | 59.5 | 62.5 | 77.4 | 72.7 |
| DKMO | 73.0 | 54.6 | 64.4 | 66.1 | 75.8 | 69.8 |
| NON-PLANT, n = 2732 | | | | | | |
| Kernel SVM | 67.5 | 71.0 | 67.8 | 71.5 | 79.3 | 77.6 |
| DKMO | 73.2 | 56.3 | 71.1 | 77.1 | 82.5 | 77.5 |
| PSORT+, n = 541 | | | | | | |
| Kernel SVM | 58.1 | 76.6 | 76.5 | 79.0 | 48.2 | 57.0 |
| DKMO | 57.8 | 80.4 | 83.1 | 78.8 | 50.6 | 60.6 |
| PSORT-, n = 1444 | | | | | | |
| Kernel SVM | 59.3 | 79.7 | 81.2 | 75.5 | 58.1 | — |
| DKMO | 55.5 | 79.5 | 81.5 | 80.4 | 61.9 | — |

TABLE 2

Classification Performance on Protein Subcellular Datasets with Multiple Kernel Learning
Multiple Kernel Learning

| Uniform | UFO-MKL | M-DKMO |
|---|---|---|
| PLANT, n = 940 | | |
| 90.3 | 90.4 | 90.9 |
| NON-PLANT, n = 2732 | | |
| 91.1 | 90.3 | 93.8 |
| PSORT+, n = 541 | | |
| 80.1 | 82.8 | 82.4 |
| PSORT-, n = 1444 | | |
| 85.7 | 89.1 | 87.2 |

Figure 5A:
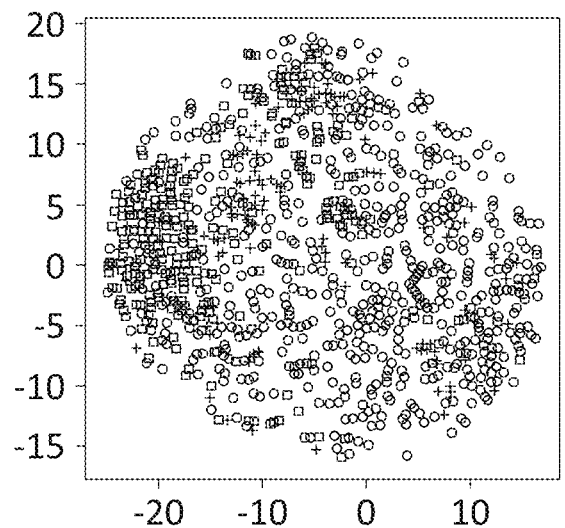
FIG. 5(a) illustrates a two-dimensional (2D) t-SNE (T-distributed Stochastic Neighbor Embedding) visualization of the representation obtained for the non-plant dataset using the base kernel (Kernel 5)
Figure 5B:
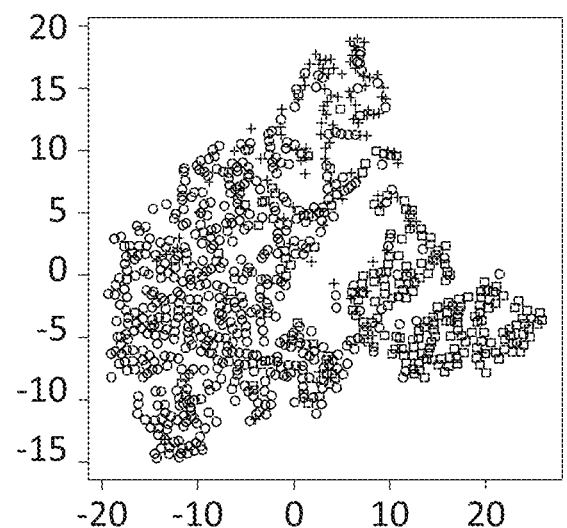
FIG. 5(b) illustrates a 2D t-SNE visualization of the representation obtained for the non-plant dataset using the learned representations from the DKMO approach.
Figure 5C:
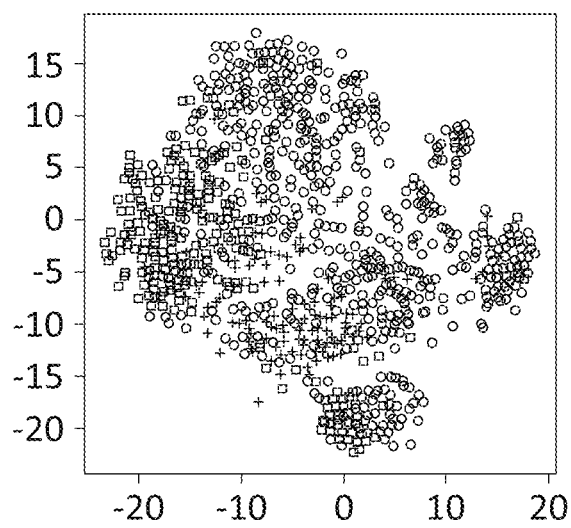
FIG. 5(c) illustrates a 2D t-SNE visualization of the representation obtained for the non-plant dataset using uniform multiple kernel fusion.
Figure 5D:
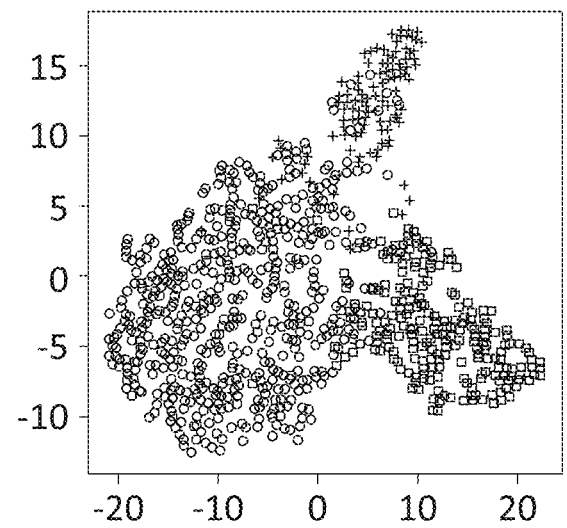
FIG. 5(d) illustrates a 2D t-SNE visualization of the representation obtained for the non-plant dataset using the learned representations from the M-DKMO approach.

The experimental results are shown in Tables 1 and 2, in which the classification accuracy is measured as the averaged fraction of correctly predicted labels among all classes. As it can be observed from the results, on all datasets, the DKMO algorithm consistently produces improved or at least similar classification accuracies in comparison to baseline kernel SVM. In many cases, for example kernel 1 and 4 in the non-plant datasets, the improvements are significant. For the few cases where DKMO is inferior, for example kernel 2, the quality of the Nyström approximation is the factor. By adopting more sophisticated approximations, or increasing the size of the ensemble, one can possibly make DKMO more effective in such scenarios. Furthermore, in the multiple kernel learning case, the described M-DKMO approach produces competitively performance consistently In order to understand the behavior of the representations generated by different approaches, the t-SNE (T-distributed Stochastic Neighbor Embedding) algorithm can be used to obtain 2-D visualizations of the considered baselines and the described approaches. FIG. 5(a) illustrates a two-dimensional (2D) t-SNE visualization of the representation obtained for the non-plant dataset using the base kernel (Kernel 5). FIG. 5(b) illustrates a 2D t-SNE visualization of the representation obtained for the non-plant dataset using the learned representations from the DKMO approach. FIG. 5(c) illustrates a 2D t-SNE visualization of the representation obtained for the non-plant dataset using uniform multiple kernel fusion. FIG. 5(d) illustrates a 2D t-SNE visualization of the representation obtained for the non-plant dataset using the learned representations from the M-DKMO approach. The samples are shaded in FIGS. 5(a)-(d) by their corresponding class associations. For demonstration, the kernel 5 can be considered from the non-plant dataset in the single kernel learning case, and the uniform multiple kernel fusion, because it performs better than UFO-MKL, can be considered for the multiple kernel case. The 2D t-SNE embeddings of the representations obtained by employing truncated SVD on the kernel matrices are considered. To be consistent with the described approaches, the rank of truncated SVD is fixed to be r×P, where the DKMO architecture generates P dense embeddings of rank r. In both DKMO and M-DKMO approaches, t-SNE is performed on the representation obtained from the fusion layers. The comparisons in FIGS. 5(a)-(d) show that the described single kernel learning and MKL methods produce more highly discriminative representations than the corresponding conventional approach.

Image Classification

In visual object recognition and scene understanding, combining multiple feature representations has been shown to yield significantly higher classification accuracies. The reason behind this success is that a large class of features that characterize colors, shapes and textures can be exploited while discriminating between different image categories. In this experiment, the flowers 17 and flowers 102 datasets from www.robots.ox.ac.ukF-vgg/data/flowers are considered, which is comprised of flower images belonging to 17 and 102 classes respectively. Samples of the flowers 102 dataset are shown in images 411-416 in FIG. 4(a). The precomputed distance matrices contain $X^2$ distances calculated based on bag of visual words representations of features such as HOG, HSV, SIFT etc.

The experiment involves constructing $X^2$ kernels from these distance matrices as $k(x_i, x_j) = e-\gamma l(x_i x_j)$, where l denotes the distance between $x_i$ and $x_j$. The $\gamma$ value is empirically estimated as the inverse of the average pairwise distances. To be consistent with the setting from conventional approaches on the flowers 102 dataset, training is considered on both 20 samples per class and 30 samples per class, respectively. The classification results in Tables 3 and 4 clearly evidence the effectiveness of the described kernel machine customization (e.g., optimization) methods in image classification tasks.

TABLE 3

Classification Performance on Flower Datasets with Single Kernel Learning
Single Kernel Learning

| Method | Kernel 1 | Kernel 2 | Kernel 3 | Kernel 4 | Kernel 5 | Kernel 6 | Kernel 7 |
|---|---|---|---|---|---|---|---|
| FLOWERS 17, n = 1360 | | | | | | | |
| Kernel SVM | 63.2 | 61.5 | 66.2 | 71.5 | 68.3 | 72.6 | 67.4 |
| DKMO | 63.5 | 63.5 | 62.4 | 71.8 | 64.1 | 75.6 | 67.4 |
| FLOWERS 102-20, n = 8189 | | | | | | | |
| Kernel SVM | 43.1 | 43.0 | 35.7 | 53.1 | — | — | — |
| DKMO | 49.8 | 43.7 | 36.5 | 54.0 | — | — | — |
| FLOWERS 102-30, n = 8189 | | | | | | | |
| Kernel SVM | 48.4 | 47.7 | 40.4 | 57.7 | — | — | — |
| DKMO | 53.5 | 49.9 | 38.8 | 58.9 | — | — | — |

TABLE 4

Classification Performance on Flower Datasets
with Multiple Kernel Learning
Multiple Kernel Learning

| Uniform | UFO-MKL | M-DKMO |
|---|---|---|
| FLOWERS 17, n = 1360 | | |
| 85.3 | 87.1 | 90.0 |
| FLOWERS 102-20, n = 8189 | | |
| 69.9 | 75.7 | 76.5 |
| FLOWERS 102-30, n = 8189 | | |
| 73.0 | 80.4 | 80.7 |

Sensor-Based Activity Recognition

Sensor-based activity recognition is used to evaluate the described approaches on time-series analysis. Recent advances in activity recognition have shown promising results in the applications of fitness monitoring and assisted living. However, when applied to smartphone sensors and wearables, existing algorithms still have limitations dealing with the measurement inaccuracy and noise. This challenge can be addressed by performing sensor fusion, wherein each sensor is characterized by multiple feature sources, which naturally enables multiple kernel learning schemes.

In this experiment, the performance of the described framework is evaluated using the USC-HAD dataset, as obtained from sipi.usc.edu/HAD, which contains 12 different daily activities for each of the subjects, namely walking forward, walking left, walking right, walking upstairs, walking downstairs, running forward, jumping up, sitting, standing, sleeping, elevator up, and elevator down. Samples of these measurements are shown in FIG. 4(c), including accelerometer measurements 431 for walking forward, accelerometer measurements 432 for running forward, and accelerometer measurements 433 for jumping up. The measurements are obtained using a 3-axis accelerometer at a sampling rate of 100 Hz. Following standard experiment methodology, non-overlapping frames of 5 seconds each are extracted, creating a total of 5353 frames. A 80-20 random split on the data is performed to generate the train and test sets.

In order to characterize distinct aspects of the time-series signals, 3 sets of features are considered. First, a set of statistics features are considered including mean, median, standard deviation, kurtosis, skewness, total acceleration, mean-crossing rate and dominant frequency. These features encode the statistical properties and frequency domain information.

Second, a set of shape features can be considered, which can be derived from Time Delay Embeddings (TDE) to model the underlying dynamical system. The TDEs of a time-series signal x can be defined as a matrix S whose ith row is $S_i=[X_i, X_{i+\tau}, \ldots, x_{i+(m-1)\tau}]$, where m is number of samples and $\tau$ is the delay parameter. The time-delayed observation samples can be considered as points in $\mathbb{R}^m$, which is referred as the delay embedding space. In this experiment, the delay parameter $\tau$ is fixed to 10 and embedding dimension m is chosen to be 8. Following the approach in, Principle Component Analysis (PCA) is used to project the embedding to 3-D for noise reduction. To model the topology of the delayed observations in 3-D, the pair-wise distances are measured between samples as $\|s_i-s_j\|_2$ and build the distance histogram feature with a pre-specified bin size.

Third, a set of correlation features can be considered, which can characterize the dependence between time-series signals. The absolute value of Pearson correlation coefficient is calculated. To account for shift between the two signals, the maximum absolute coefficient for a small range of shift values is identified. The correlation matrix is determined to be a valid kernel by removing the negative eigenvalues. Given the eigen-decomposition of the correlation matrix $R=U_R \wedge_R U_R^T$, where $\wedge_R=\text{diag}(\sigma_1, \ldots, \sigma_n)$ and $\sigma_1 \geq \ldots \geq \sigma_r \geq 0 \geq \sigma_{r+1} \geq \ldots \geq \sigma_n$, the correlation kernel is constructed as $K=U_R \hat{\wedge}_R U_R^T$, where $\hat{\wedge}_R=\text{diag}(\sigma_1, \ldots, \sigma_r, 0, \ldots, 0)$.

Figure 6:
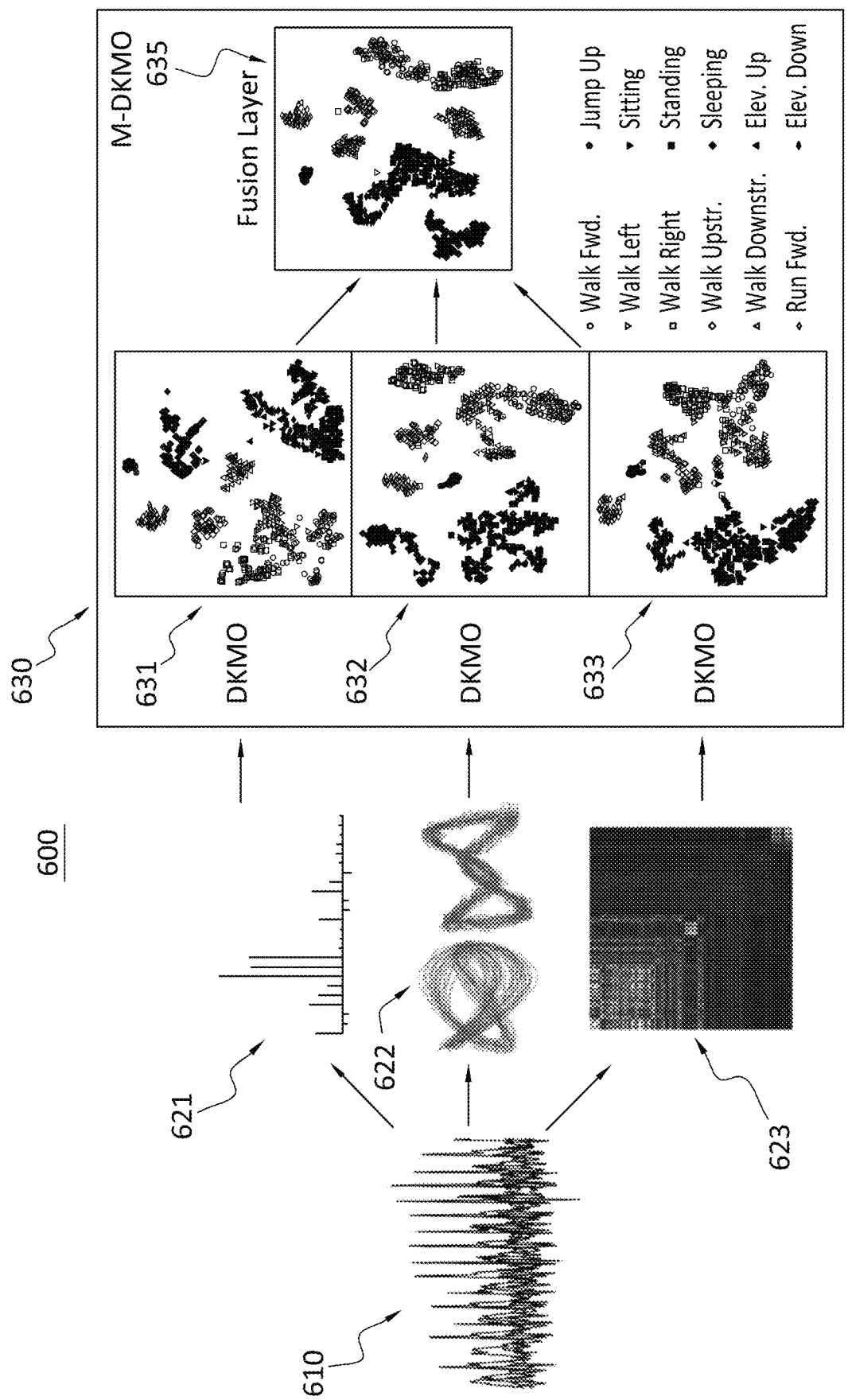
FIG. 6 illustrates a flow chart showing an exemplary pipeline 600 of the approach of the activity recognition experiment using the USC-AHD dataset.

FIG. 6 illustrates a flow chart showing an exemplary pipeline 600 of the approach of the activity recognition experiment using the USC-AHD dataset. The raw 3-axis accelerometer signal is shown in a block 610, and three distinct sets of features are extracted, namely the set of statistics features, including the time-series statistics, as shown in a block 621; the set of shape features, including the topological structure in which TDE descriptors were extracted, as shown in a block 622, and the set of correlation features, including the correlation kernel, as shown in a block 623. Pipelines 600 then proceeds to a block 630. The t-SNE visualizations of the representations learned by DKMO models are shown at blocks 631-633 of block 630. The t-SNE visualization of the representation learned by the M-DKMO, based on the DKMO models, is shown in a block 635 of block 630. In blocks 631-633 and 635, the points are coded according to the activity key.

As it can be observed in FIG. 6, the statistics and shape representations are explicit feature sources and hence the dense embeddings can be constructed using the clustered Nyström method (through RBF and $X^2$ kernel formulations respectively). Alternatively, the correlation representation can be obtained directly based on the similarity metric, and thus, this experiment employs the conventional Nyström approximations on the kernel. However, regardless of the difference in dense embedding construction, the kernel learning procedure is the same for both cases. The t-SNE visualizations in block 631-633 of FIG. 6 show that the classes Sitting, Standing, Elevator Up and Elevator Down are difficult to discriminate using any of the individual kernels. In comparison, the fused representation obtained using the M-DKMO algorithm, as shown in block 635 of FIG. 6 results in a much improved class separation, thereby demonstrating the effectiveness of the kernel fusion architecture.

TABLE 5

Classification Performance on USC-HAD Datasets with Single Kernel Learning
Single Kernel Learning

| Method | Kernel 1 | Kernel 2 | Kernel 3 |
|---|---|---|---|
| USC-HAD, n = 5353 | | | |
| Kernel SVM | 77.8 | 74.6 | 75.4 |
| DKMO | 82.9 | 76.2 | 79.2 |

TABLE 6

Classification Performance on USC-HAD Datasets with Multiple Kernel Learning
Multiple Kernel Learning

| Uniform | UFO-MKL | M-DKMO |
|---|---|---|
| USC-HAD, n = 5353 | | |
| 89.0 | 87.1 | 90.4 |

The classification results in Tables 5 and 6 show that DKMO improves each individual kernel performance significantly. In the case of multiple kernel learning, the striking observation is that the uniform merging of kernels is a very strong baseline and the state-of-the-art UFO-MKL algorithm could produce lesser accuracy. On the contrary, the M-DKMO framework described further improves uniform merging and this again demonstrates its consistent performance.

Discussion

In many embodiments, the systems and methods described herein provide a framework to facilitate kernel learning using deep architectures. In several embodiments, the approach described utilizes the similarity kernel matrix to generate an ensemble of dense embeddings for the data samples and employs fully connected networks for representation learning. The described approach can involve learning representations describing the characteristics of different linear subspaces in the RKHS. By enabling the neural network to exploit the native space of a pre-defined kernel, models are obtained which can involve much improved generalization. The kernel dropout process can allow the predictive model to exploit the complementary nature of the different subspaces and emulate the behavior of kernel fusion using a backpropagation-based customization (e.g., optimization) setting. In addition to improving upon the strategies adopted in kernel machine customization (e.g., optimization), the described approach demonstrates improvements over conventional kernel methods in different applications. Using these improved representations, multiple kernel learning can be performed efficiently. In addition to showing good convergence characteristics, the M-DKMO approach consistently outperforms state-of-the-art MKL methods. The empirical results clearly evidence the usefulness of using deep networks as an alternative approach to building kernel machines. Similar to the recent approaches such as the convolutional kernel networks, principles from kernel learning theory can enable the design of novel training strategies for neural networks. This can be particularly effective in applications that employ fully connected networks and in scenarios where training data is limited, wherein bridging these two paradigms can lead to capacity-controlled modeling for better generalization.

The systems and methods described herein can provide a general framework for customizing (e.g., optimizing) kernel machines with deep learning, which can be applied to many inference problems including protein subcellular localization, image classification and activity recognition. Some embodiments create an embedding layer for kernel machine using an ensemble of Nyström kernel approximations and employ fully connected deep neural networks (DNNs) with novel dropout regularization strategy. The embedding layer bridges kernel machines with DNN, whereas DNN enables end-to-end inferences. The framework described herein also can be extended to the case of multiple kernels for fusing distinct feature sources.

The success of deep neural networks in a wide variety of computer vision tasks has emphasized the benefit of highly non-linear and nonparametric models. Although DNN can approximate a large class of functions for prediction by composition of multiple non-linear transformations, its increasing network complexity typically involves exhaustive tuning of several hyper-parameters. This can result in sub-optimal solutions or model overfitting. In such cases, a possible alternative solution is to employ kernel machines. The systems and methods described herein bridge kernel machines with deep learning and employ fully connected neural networks to customized (e.g., optimize) the kernel machines for inferring the predictive model. The described approach enables end-to-end learning while being generic to a wide range of problems.

State-of-the-art approaches for combining principles from kernel methods and deep learning either utilize kernel compositions to emulate neural network layer stacking or facilitate the customization (e.g., optimization) of deep architectures with data-specific kernels. In the first direction, specific kernel formulation was used to attempt to emulate the behavior of an infinite single-layer threshold network. Multiple kernels of this kind were then stacked together to form the final kernel to emulate deep neural network and a Support Vector Machine is employed with the kernel for learning. In the second direction, kernel approximation is carried out under convolutional neural network to construct the convolutional kernel network and backpropagation is utilized to customized (e.g., optimize) the approximation parameters. In the contrast, the systems and methods described herein consider the problem of customizing (e.g., optimizing) kernel machines using DNNs. The described approach can improve the classification performance over conventional kernel methods including kernel Support Vector Machine and Multiple Kernel Learning. Compared to the kernel stacking approach, the described approach utilizes DNNs for kernel customization (e.g., optimization) and therefore avoids the scalability issue and customization (e.g., optimization) difficulty of kernel Support Vector Machine. Compared to convolutional kernel network, the described approach can be general and not restricted to applications that use particular DNN architectures (e.g., convolutional neural networks).

Various embodiments can utilize the power of deep architectures in end-to-end learning and feature fusion to facilitate kernel methods. Various approaches first extract multiple dense embeddings from a precomputed kernel matrix K and optionally the feature domain X if accessible during training. In the dense embedding, the cases of having kernel matrix or feature set as input can be considered separately, and conventional Nyström approximation and Clustered Nyström approximation can be utilized, respectively. On top of each embedding, a fully connected neural network can be built for representation learning. At each hidden layer of the network, dropout regularization can be used to prevent overfitting, and batch normalization can be adopted to accelerate training. In several embodiments, the representation learning phase is not decoupled from the actual task, which can advantageously lead to high-fidelity predictive models. Given the inferred latent spaces from representation learning, another layer can be stacked, which can be responsible for fusing them and obtaining a concise representation for inference tasks. In the fusion layer, kernel dropout can be used for highly effective regularization: the entire representations learned from some randomly chosen dense embeddings can be dropped in the training process. Finally, a softmax layer can be used at the top to perform classification.

Several embodiments involve a variant of DKMO, namely M-DKMO, which can be applied to the case of multiple kernels for fusing multiple feature sources. A common problem in complex recognition tasks can involve different feature sources characterizing distinct aspects of data and containing complementary information. Various embodiments involve an end-to-end learning network that is constructed based on a set of pre-trained DKMO models corresponding to the different kernels and a global fusion layer that combines the hidden features from those networks. After pre-training the DKMO network for each of the kernels with a softmax layer, the final softmax layer can be ignored, and the customized (e.g., optimized) network parameters can be used to initialize the M-DKMO network. The same kernel dropout strategy can be adopted in the global fusion layer before applying the merge operation.

In some embodiments, the systems and methods described herein can involve a practical approach to improving kernel machines for classification problems. An ensemble of dense embeddings from kernel matrix can be generated, and fully connected neural networks can be employed for representation learning. By enabling the neural network to exploit the native space of a pre-defined kernel, models can be obtained with much improved generalization.

In some embodiments, the systems and methods described herein can be applied to any classification problem where there is a valid kernel defined on the data domain. The empirical results evidence the usefulness of using deep networks as an alternative approach to building kernel machines. The framework can be particularly effective in applications that employ fully connected networks and in scenarios where training data is limited, and bridging these two paradigms can lead to capacity-controlled modeling for better generalization.

The systems and methods described herein can provide an alternative approach to building kernel machines. By enabling the neural network to exploit the native space of a pre-defined kernel, models with much improved generalization and classification performance in different applications can be obtained when compared to conventional kernel Support Vector Machine. Using these improved representations, multiple kernel learning can be performed efficiently. In addition to showing good convergence characteristics, the M-DKMO approach consistently outperforms state-of-the-art Multiple Kernel Learning methods.

The systems and methods described herein can be useful in a wide range of classification problems including protein subcellular localization, image classification and activity recognition, as examples. The described approach can be particularly useful in scenarios where training data is limited and multiple feature sources are present.

In many embodiments, the techniques described herein can customized (e.g., optimizes) kernel machine using deep learning. The power of deep architecture in representation learning and feature fusion can be utilized to facilitate kernel machines to perform effective end-to-end learning.

In several embodiments, the techniques described here in can be general and can be applied to any classification problem where a valid kernel is defined. For example, suitable application domains can include, but are not limited to, cell biology, images, time-series data, graphs, and sequences. Due to the fully connected neural network structure, the architecture can remain the same when switching between applications, by simply changing the kernel representation.

In some embodiments, an ensemble of Nyström approximations under the deep architecture setting can be utilized. This approach can serve as a component in the described framework to obtain the dense embedding, which can bridge kernel representation with deep learning.

In a number of embodiments, kernel dropout can be utilized. Compared to regular dropout, kernel dropout strategy can provide highly effective regularization when the number of dense embeddings or number of kernels is large. In many embodiments, kernel dropout can result in faster convergence and lower classification error.

In various embodiments, the extension to multiple kernels can be particularly useful for feature fusion problems, which are very common in real-world applications. This described variant can achieve consistently better performance compared to state-of-the-art Multiple Kernel Learning algorithm in feature fusion.

In many embodiments, under the described algorithm framework, the computational complexity of conventional kernel Support Vector Machine and Multiple Kernel Learning can be transferred to training neural networks, which can be significantly mitigated by GPU utilization.

In several embodiments, the described approach can handle multiple types of data and a limited amount of learning (training) data, which provides advantages over conventional neural networks in which learning (and tuning parameters) is difficult with limited training data.

Figure 7:
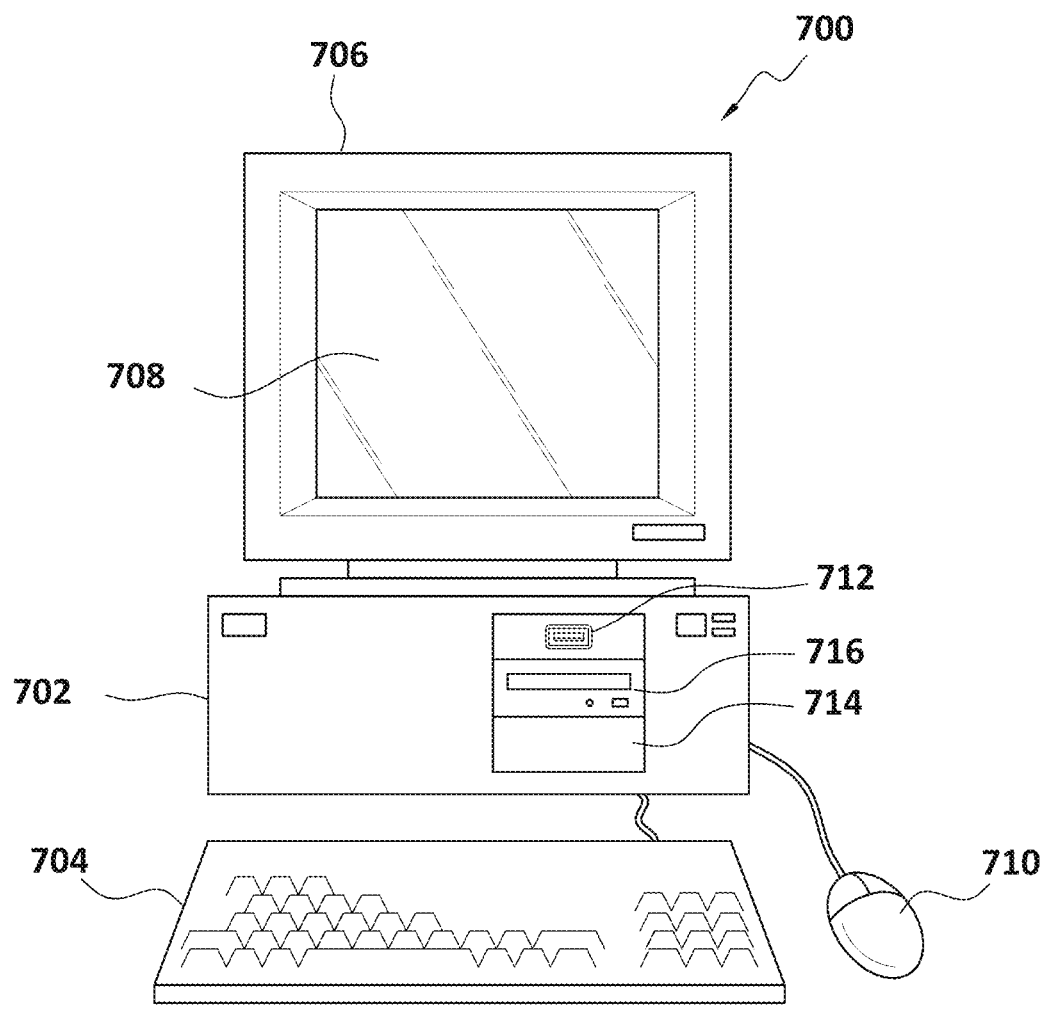
FIG. 7 illustrates a computer system.
Figure 8:
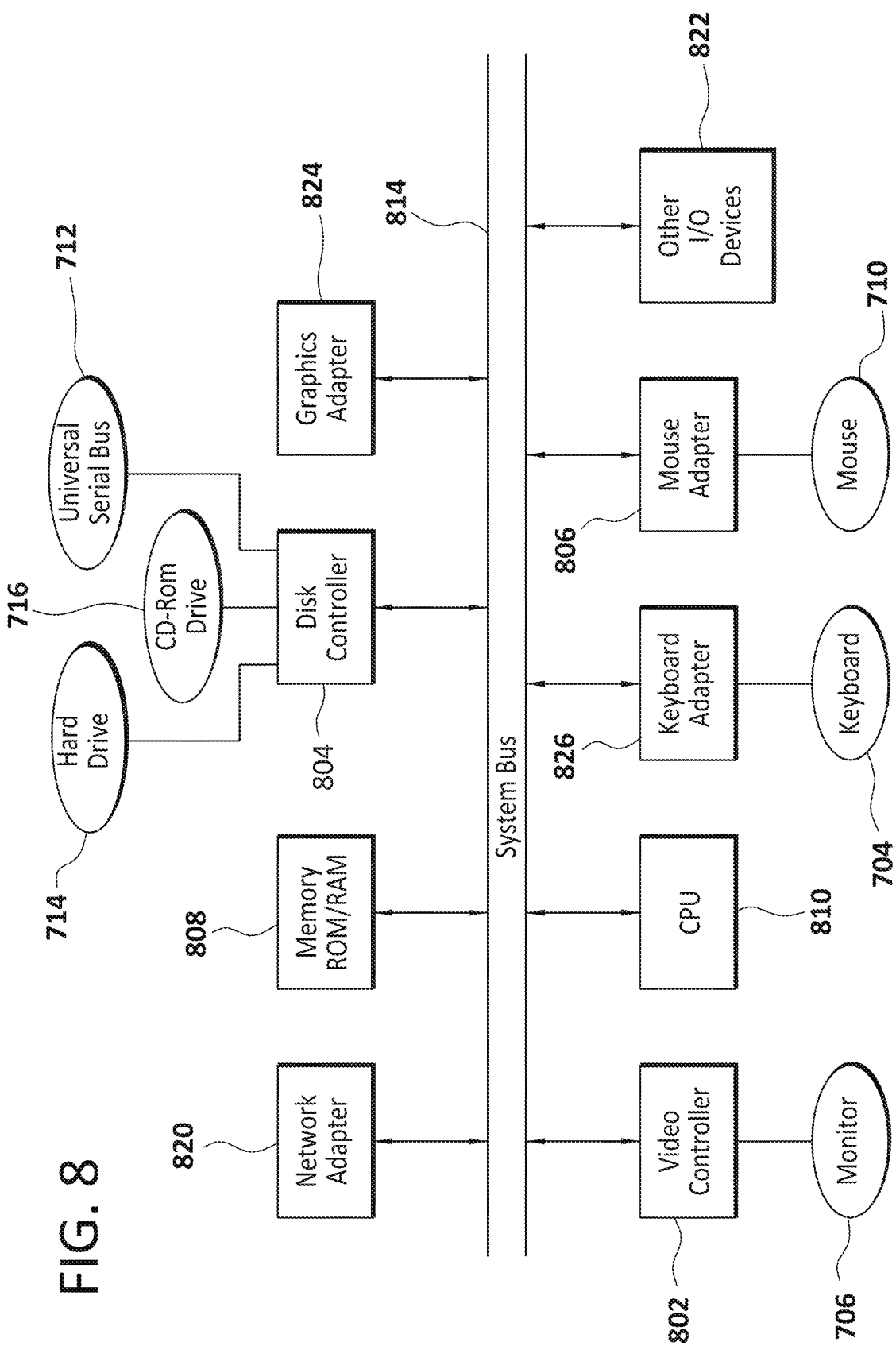
FIG. 8 illustrates a representative block diagram of an example of the elements included in the circuit boards inside a chassis of the computer system of FIG. 7.
Figure 9:
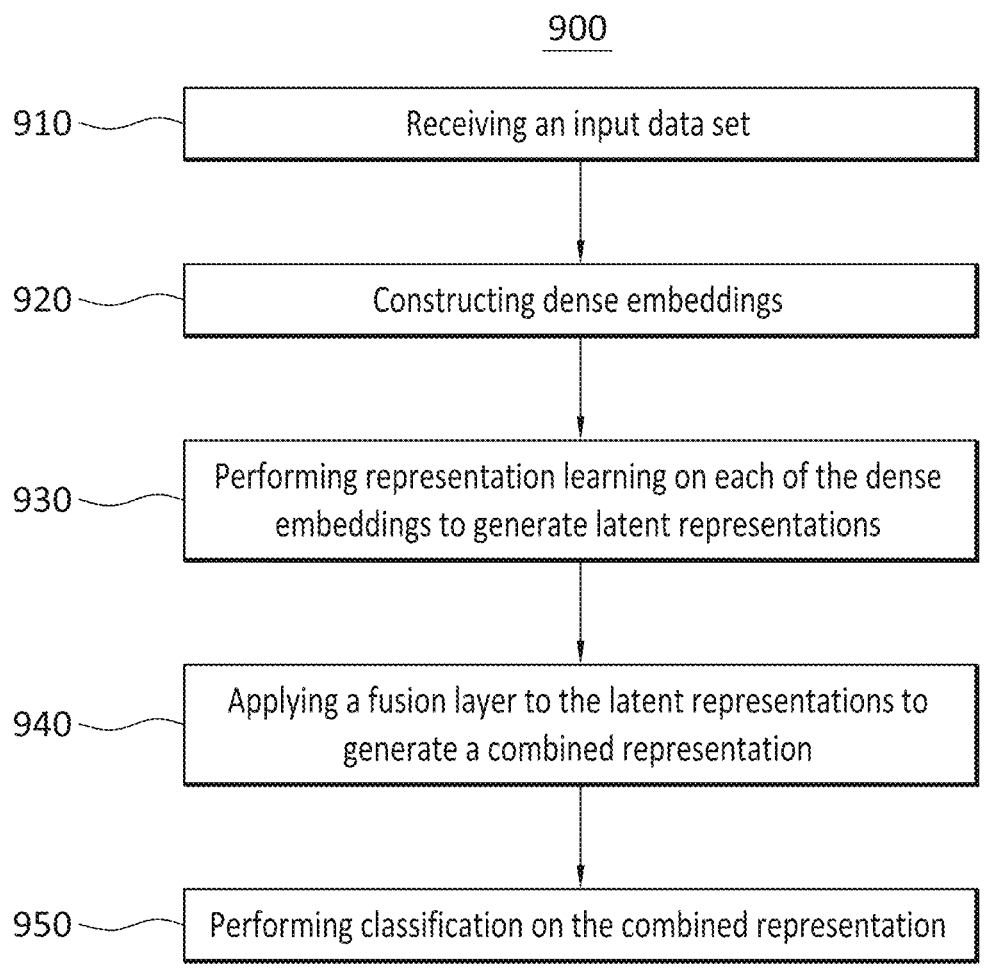
FIG. 9 illustrates a flowchart for a method, according to another embodiment.
Figure 10:
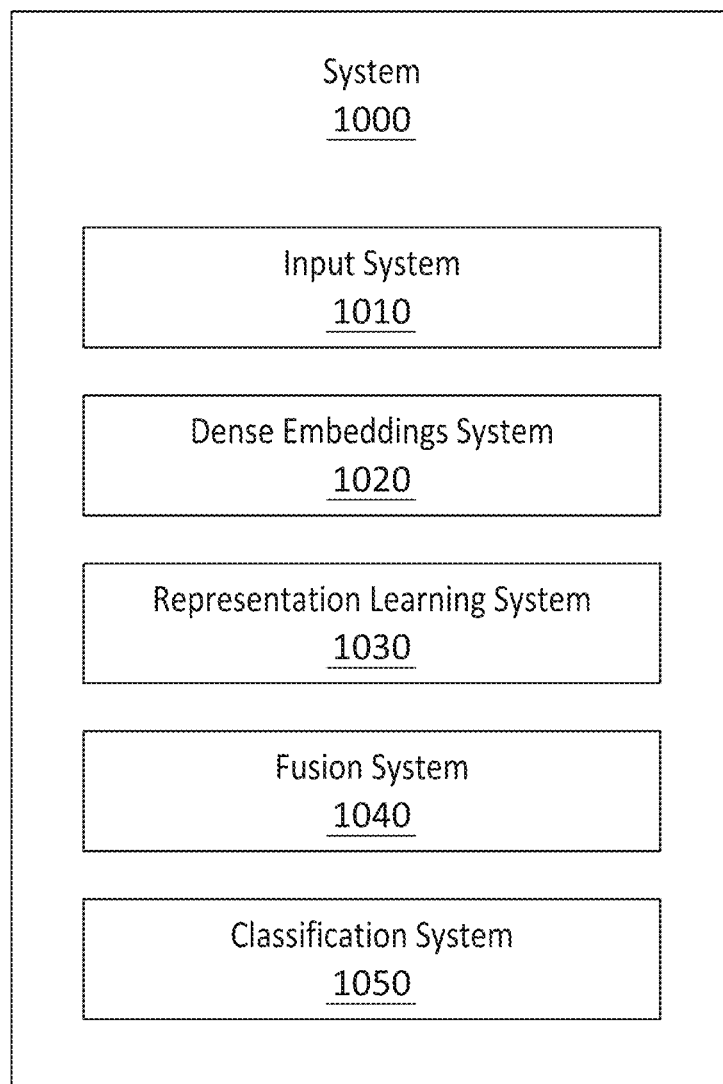
FIG. 10 illustrates a block diagram of a system, according to another embodiment.

Turning to the next drawing, FIG. 7 illustrates an exemplary embodiment of computer system 700, all of which or a portion of which can be suitable for implementing the techniques described herein, including implementing method 100 (FIG. 1), method 300 (FIG. 3), pipeline 600 (FIG. 6), method 900 (FIG. 9, described below), and/or system 1000 (FIG. 1000 (FIG. 10, described below). As an example, a different or separate one of chassis 702 (and its internal components) can be suitable for implementing the techniques described herein. Furthermore, one or more elements of computer system 700 (e.g., refreshing monitor 706, keyboard 704, and/or mouse 710, etc.) can also be appropriate for implementing the techniques described herein. Computer system 700 comprises chassis 702 containing one or more circuit boards (not shown), Universal Serial Bus (USB) port 712, Compact Disc Read-Only Memory (CD-ROM) and/or Digital Video Disc (DVD) drive 716, and hard drive 714. A representative block diagram of the elements included on the circuit boards inside chassis 702 is shown in FIG. 8. Central processing unit (CPU) 810 in FIG. 8 is coupled to system bus 814 in FIG. 8. In various embodiments, the architecture of CPU 810 can be compliant with any of a variety of commercially distributed architecture families.

Continuing with FIG. 8, system bus 814 also is coupled to memory storage unit 808, where memory storage unit 808 comprises both read only memory (ROM) and random access memory (RAM). Non-volatile portions of memory storage unit 808 or the ROM can be encoded with a boot code sequence suitable for restoring computer system 700 (FIG. 7) to a functional state after a system reset. In addition, memory storage unit 808 can comprise microcode such as a Basic Input-Output System (BIOS). In some examples, the one or more memory storage units of the various embodiments disclosed herein can comprise memory storage unit 808, a USB-equipped electronic device, such as, an external memory storage unit (not shown) coupled to universal serial bus (USB) port 712 (FIGS. 7-8), hard drive 714 (FIGS. 7-8), and/or CD-ROM or DVD drive 716 (FIGS. 7-8). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 810.

In the depicted embodiment of FIG. 8, various I/O devices such as disk controller 804, graphics adapter 824, video controller 802, keyboard adapter 826, mouse adapter 806, network adapter 820, and other I/O devices 822 can be coupled to system bus 814. Keyboard adapter 826 and mouse adapter 806 are coupled to keyboard 704 (FIGS. 7-8) and mouse 710 (FIGS. 7-8), respectively, of computer system 700 (FIG. 7). While graphics adapter 824 and video controller 802 are indicated as distinct units in FIG. 8, video controller 802 can be integrated into graphics adapter 824, or vice versa in other embodiments. Video controller 802 is suitable for refreshing monitor 706 (FIGS. 7-8) to display images on a screen 708 (FIG. 7) of computer system 700 (FIG. 7). Disk controller 804 can control hard drive 714 (FIGS. 7-8), USB port 712 (FIGS. 7-8), and CD-ROM drive 716 (FIGS. 7-8). In other embodiments, distinct units can be used to control each of these devices separately.

In some embodiments, network adapter 820 can comprise and/or be implemented as a WNIC (wireless network interface controller) card (not shown) plugged or coupled to an expansion port (not shown) in computer system 700 (FIG. 7). In other embodiments, the WNIC card can be a wireless network card built into computer system 700 (FIG. 7). A wireless network adapter can be built into computer system 700 by having wireless communication capabilities integrated into the motherboard chipset (not shown), or implemented via one or more dedicated wireless communication chips (not shown), connected through a PCI (peripheral component interconnector) or a PCI express bus of computer system 700 (FIG. 7) or USB port 712 (FIG. 7). In other embodiments, network adapter 820 can comprise and/or be implemented as a wired network interface controller card (not shown).

Although many other components of computer system 700 (FIG. 7) are not shown, such components and their interconnection are well known to those of ordinary skill in the art. Accordingly, further details concerning the construction and composition of computer system 700 and the circuit boards inside chassis 702 (FIG. 7) are not discussed herein.

When computer system 700 in FIG. 7 is running, program instructions stored on a USB-equipped electronic device connected to USB port 712, on a CD-ROM or DVD in CD-ROM and/or DVD drive 716, on hard drive 714, or in memory storage unit 808 (FIG. 8) are executed by CPU 810 (FIG. 8). A portion of the program instructions, stored on these devices, can be suitable for carrying out at least part of the techniques described herein.

Although computer system 700 is illustrated as a desktop computer in FIG. 7, there can be examples where computer system 700 may take a different form factor while still having functional elements similar to those described for computer system 700. In some embodiments, computer system 700 may comprise a single computer, a single server, or a cluster or collection of computers or servers, or a cloud of computers or servers. Typically, a cluster or collection of servers can be used when the demand on computer system 700 exceeds the reasonable capability of a single server or computer. In certain embodiments, computer system 700 may comprise a portable computer, such as a laptop computer. In certain other embodiments, computer system 700 may comprise a mobile device, such as a smart phone. In certain additional embodiments, computer system 700 may comprise an embedded system.

Turning ahead in the drawings, FIG. 9 illustrates a flow chart for a method 900. In some embodiments, method 900 can be a method of customizing kernel machine with deep neural networks. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped.

In many embodiments, system 1000 (FIG. 10, described below) can be suitable to perform method 900 and/or one or more of the activities of method 900. In these or other embodiments, one or more of the activities of method 900 can be implemented as one or more computing instructions configured to run at one or more processors and configured to be stored at one or more non-transitory computer readable media. Such non-transitory computer readable media can be part of a computer system such as system 1000 (FIG. 10, described below). The processor(s) can be similar or identical to the processor(s) described above with respect to computer system 700 (FIG. 7).

In some embodiments, method 900 and other blocks in method 900 can include using a distributed network including distributed memory architecture to perform the associated activity. This distributed architecture can reduce the impact on the network and system resources to reduce congestion in bottlenecks while still allowing data to be accessible from a central location.

Referring to FIG. 9, method 900 can include a block 910 of receiving an input data set. In many embodiments, the input data set can include one of a feature domain set or a kernel matrix. The input data set can be similar or identical to input 110 (FIG. 1), input 311 (FIG. 3), input 312 (FIG. 3), input 313 (FIG. 3), and/or the kernels in block 621 (FIG. 6), block 622 (FIG. 6), and/or block 623 (FIG. 6). In some embodiments, the input data set can be generated as a feature domain set or a kernel matrix based on prior input, such as images 411-416 (FIG. 4(*a*)), sequences 421-423 (FIG. 4(*b*)), accelerometer measurements 431-433 (FIG. 4(*c*)), and/or the accelerometer measurement in block 610 (FIG. 6).

In some embodiments, such as when implementing an M-DKMO approach, block 910 of receiving an input data set further can include receiving a plurality of input data sets. In many embodiments, the plurality of input data set can include the input data set. In several embodiments, each of the plurality of input data sets can include one of feature domain sets or kernel matrices. The plurality of input data asset can be similar or identical to multiple inputs 310 (FIG. 3).

In several embodiments, method 900 also can include a block 920 of constructing dense embeddings using: (i) Nyström approximations on the input data set when the input data set comprises the kernel matrix, and (ii) clustered Nyström approximations on the input data set when the input data set comprises the feature domain set. The dense embeddings can be similar or identical to dense embeddings 121-123 (FIG. 1).

In some embodiments, such as when implementing an M-DKMO approach, block 920 of constructing dense embeddings using: (i) Nyström approximations on the input data set when the input data set comprises the kernel matrix, and (ii) clustered Nyström approximations on the input data set when the input data set comprises the feature domain set further can include constructing the dense embeddings using: (i) the Nyström approximations on the plurality of input data sets when the plurality of input data sets comprise the kernel matrices, and (ii) the clustered Nyström approximations on the plurality of input data sets when the plurality of input data sets comprise the feature domain sets.

In a number of embodiments, method 900 additionally can include a block 930 of performing representation learning on each of the dense embeddings using a multi-layer fully-connected network for each of the dense embeddings to generate latent representations corresponding to each of the dense embeddings. The representation learning can be similar or identical to representation learning 130 (FIG. 1). The multi-layer fully-connected network can be similar or identical to fully connected neural networks 131-133 (FIG. 1).

In a number of embodiments, block 930 of performing representation learning on each of the dense embeddings using a multi-layer fully-connected network for each of the dense embeddings to generate latent representations corresponding to each of the dense embeddings further can include using dropout regularization at each hidden layer of the multi-layer fully-connected network. In various embodiments, block 930 of performing representation learning on each of the dense embeddings using a multi-layer fully-connected network for each of the dense embeddings to generate latent representations corresponding to each of the dense embeddings additionally can include using batch normalization.

In several embodiments, method 900 further can include a block 940 of applying a fusion layer to the latent representations corresponding to the dense embeddings to generate a combined representation. The fusion layer can be similar or identical to fusion layer 140 (FIG. 1) and/or fusion layer 330 (FIG. 3). In a number of embodiments, backpropagation can be used to tune parameters for the representation learning in block 930 and/or the fusion layer in block 940.

In some embodiments, block 940 of applying a fusion layer to the latent representations corresponding to the dense embeddings to generate a combined representation can include performing merging of the dense embeddings using at least one of concatenation, summation, averaging, or multiplication.

In many embodiments, block 940 of applying a fusion layer to the latent representations corresponding to the dense embeddings to generate a combined representation can include imposing a kernel dropout regularization. In various embodiments, imposing the kernel dropout regularization further can include dropping an entirety of the latent representations corresponding to a portion of the dense embeddings chosen at random. In several embodiments, the portion of the dense embeddings chosen at random can be 30 percent to 50 percent of a total quantity of the dense embeddings.

In some embodiments, such as when implementing an M-DKMO approach, block 940 of applying a fusion layer to the latent representations corresponding to the dense embeddings to generate a combined representation can include generating an initial combined representation corresponding to the dense embeddings for each of the plurality of input data sets, and generating the combined representation using the initial combined representations corresponding to the dense embeddings across the plurality of input data sets. For example, a first fusion layer, such as fusion layer 140 (FIG. 4), can be used to generate the initial combined representation for each of the plurality of input data sets, and a combined fusion layer, such as fusion layer 330 (FIG. 3), can be used to generate the combined representation across the plurality of input data sets. In certain such embodiments, block 940 of applying a fusion layer to the latent representations corresponding to the dense embeddings to generate a combined representation can include imposing a kernel dropout regularization when generating initial combined representations and when generating the combined representation.

In a number of embodiments, method 900 additionally can include a block 950 of performing classification on the combined representation. In many embodiments, block 950 of performing classification on the combined representation can include using a softmax activation function on the combined representation. In several embodiments, the softmax activation function can be similar or identical to softmax layer 150 and/or softmax layer 340.

Turning ahead in the drawings, FIG. 10 illustrates a block diagram of system 1000, according to another embodiment. System 1000 is merely exemplary and is not limited to the embodiments presented herein. System 1000 can be employed in many different embodiments or examples not specifically depicted or described herein. In some embodiments, certain elements or system of system 1000 can perform various procedures, processes, and/or acts. In other embodiments, the procedures, processes, and/or acts can be performed by other suitable elements or systems. In many embodiments, the elements or systems of system 1000 can be modules of computing instructions (e.g., software modules) stored at non-transitory computer readable media. In other embodiments, the elements or systems of system 1000 can be implemented in hardware.

In many embodiments, system 1000 can include an input system 1010. In certain embodiments, input system 1010 can at least partially perform block 910 (FIG. 9) of receiving an input data set.

In several embodiments, system 1000 can include a dense embeddings system 1020. In certain embodiments, dense embeddings system 1020 can at least partially perform block 920 (FIG. 9) of constructing dense embeddings using: (i) Nyström approximations on the input data set when the input data set comprises the kernel matrix, and (ii) clustered Nyström approximations on the input data set when the input data set comprises the feature domain set.

In a number of embodiments, system 1000 can include a representation learning system 1030. In certain embodiments, representation learning system 1030 can at least partially perform block 930 (FIG. 9) of performing representation learning on each of the dense embeddings using a multi-layer fully-connected network for each of the dense embeddings to generate latent representations corresponding to each of the dense embeddings.

In a number of embodiments, system 1000 can include a fusion system 1040. In certain embodiments, fusion system 1040 can at least partially perform block 940 (FIG. 9) of applying a fusion layer to the latent representations corresponding to the dense embeddings to generate a combined representation.

In a number of embodiments, system 1000 can include a classification system 1050. In certain embodiments, classification system 1050 can at least partially perform block 950 (FIG. 9) of performing classification on the combined representation.

Although the customizing kernel machines with deep neural networks has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. As further examples, one or more of the procedures, processes, or activities of FIGS. 1, 3, 6, and 9 may include different procedures, processes, and/or activities and be performed by many different modules, in many different orders, and/or one or more of the procedures, processes, or activities of FIGS. 1, 3, 6, and 9 may include one or more of the procedures, processes, or activities of another different one of FIGS. 1, 3, 6, and 9. As another example, the systems within system 1000 in FIG. 10 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
   receiving an input data set, wherein the input data set comprises one of a feature domain set or a kernel matrix;
   constructing dense embeddings using: (i) Nyström approximations on the input data set when the input data set comprises the kernel matrix, and (ii) clustered Nyström approximations on the input data set when the input data set comprises the feature domain set;
   performing representation learning on each of the dense embeddings using a multi-layer fully-connected network for each of the dense embeddings to generate latent representations corresponding to each of the dense embeddings,
   wherein performing the representation learning further comprises:
   using dropout regularization at each hidden layer of the multi-layer fully-connected network; and
   using batch normalization;
   applying a fusion layer to the latent representations corresponding to the dense embeddings to generate a combined representation, wherein applying the fusion layer to the latent representations further comprises imposing a kernel dropout regularization; and
   performing classification on the combined representation, wherein performing the classification on the combined representation further comprises using a softmax activation function on the combined representation.

2. The system of claim 1, wherein applying the fusion layer to the latent representations further comprises:
   performing merging of the dense embeddings using at least one of concatenation, summation, averaging, or multiplication.

3. The system of claim 1, wherein:
   backpropagation is used to tune parameters for the representation learning and the fusion layer.

4. The system of claim 1, wherein imposing the kernel dropout regularization further comprises:
   dropping an entirety of the latent representations corresponding to a portion of the dense embeddings chosen at random.

5. The system of claim 4, wherein:
   the portion of the dense embeddings chosen at random is 30 percent to 50 percent of a total quantity of the dense embeddings.

6. The system of claim 1, wherein:
   receiving an input data set further comprises:
   receiving a plurality of input data sets;
   the plurality of input data sets comprise the input data set; each of the plurality of input data sets comprise one of feature domain sets or kernel matrices;
   constructing the dense embeddings further comprises:
   constructing the dense embeddings using: (i) the Nyström approximations on the plurality of input data sets when the plurality of input data sets comprise the kernel matrices, and (ii) the clustered Nyström approximations on the plurality of input data sets when the plurality of input data sets comprise the feature domain sets;
   applying the fusion layer to the latent representations further comprises:
   generating an initial combined representation corresponding to the dense embeddings for each of the plurality of input data sets; and
   generating the combined representation using the initial combined representations corresponding to the dense embeddings across the plurality of input data sets.

7. The system of claim 6, wherein applying the fusion layer to the latent representations further comprises:
   imposing a kernel dropout regularization when generating the initial combined representations and when generating the combined representation.

8. A method being implemented via execution of computing instructions configured to run at one or more processors and stored at one or more non-transitory computer-readable media, the method comprising:
   receiving an input data set, wherein the input data set comprises one of a feature domain set or a kernel matrix;
   constructing dense embeddings using: (i) Nyström approximations on the input data set when the input data set comprises the kernel matrix, and (ii) clustered Nystrom approximations on the input data set when the input data set comprises the feature domain set;
   performing representation learning on each of the dense embeddings using a multi-layer fully-connected network for each of the dense embeddings to generate latent representations corresponding to each of the dense embeddings, wherein performing the representation learning further comprises:
   using dropout regularization at each hidden layer of the multi-layer fully-connected network; and
   using batch normalization;
   applying a fusion layer to the latent representations corresponding to the dense embeddings to generate a combined representation, wherein applying the fusion layer to the latent representations further comprises imposing a kernel dropout regularization; and
   performing classification on the combined representation, wherein performing the classification on the combined representation further comprises using a softmax activation function on the combined representation.

9. The method of claim 8, wherein applying the fusion layer to the latent representations further comprises:
   performing merging of the dense embeddings using at least one of concatenation, summation, averaging, or multiplication.

10. The method of claim 8, wherein:
    backpropagation is used to tune parameters for the representation learning and the fusion layer.

11. The method of claim 8, wherein imposing the kernel dropout regularization further comprises:
    dropping an entirety of the latent representations corresponding to a portion of the dense embeddings chosen at random.

12. The method of claim 11, wherein:
the portion of the dense embeddings chosen at random is 30 percent to 50 percent of a total quantity of the dense embeddings.

13. The method of claim 8, wherein:
receiving an input data set further comprises:
   receiving a plurality of input data sets;
the plurality of input data sets comprise the input data set;
each of the plurality of input data sets comprise one of feature domain sets or kernel matrices;
constructing the dense embeddings further comprises:
   constructing the dense embeddings using: (i) the Nyström approximations on the plurality of input data sets when the plurality of input data sets comprise the kernel matrices, and (ii) the clustered Nyström approximations on the plurality of input data sets when the plurality of input data sets comprise the feature domain sets;
applying the fusion layer to the latent representations further comprises:
   generating an initial combined representation corresponding to the dense embeddings for each of the plurality of input data sets; and
   generating the combined representation using the initial combined representations corresponding to the dense embeddings across the plurality of input data sets.

14. The method of claim 13, wherein applying the fusion layer to the latent representations further comprises:
imposing a kernel dropout regularization when generating the initial combined representations and when generating the combined representation.

15. The method of claim 8, wherein: receiving an input data set further comprises: receiving a plurality of input data sets; the plurality of input data sets comprise the input data set; each of the plurality of input data sets comprise one of feature domain sets or kernel matrices.

16. The method of claim 15, wherein constructing the dense embeddings further comprises: constructing the dense embeddings using: (i) the Nyström approximations on the plurality of input data sets when the plurality of input data sets comprise the kernel matrices, and (ii) the clustered Nyström approximations on the plurality of input data sets when the plurality of input data sets comprise the feature domain sets.

17. The method of claim 15, wherein applying the fusion layer to the latent representations further comprises:
generating an initial combined representation corresponding to the dense embeddings for each of the plurality of input data sets; and
generating the combined representation using the initial combined representations corresponding to the dense embeddings across the plurality of input data sets.

18. The system of claim 1, wherein: receiving an input data set further comprises: receiving a plurality of input data sets; the plurality of input data sets comprise the input data set; each of the plurality of input data sets comprise one of feature domain sets or kernel matrices.

19. The system of claim 18, wherein constructing the dense embeddings further comprises: constructing the dense embeddings using: (i) the Nyström approximations on the plurality of input data sets when the plurality of input data sets comprise the kernel matrices, and (ii) the clustered Nyström approximations on the plurality of input data sets when the plurality of input data sets comprise the feature domain sets.

20. The system of claim 18, wherein applying the fusion layer to the latent representations further comprises:
generating an initial combined representation corresponding to the dense embeddings for each of the plurality of input data sets; and
generating the combined representation using the initial combined representations corresponding to the dense embeddings across the plurality of input data sets.

* * * * *